(12) United States Patent
Sawada et al.

(10) Patent No.: US 8,315,767 B2
(45) Date of Patent: Nov. 20, 2012

(54) CONTROL DEVICE FOR VEHICULAR AUTOMATIC TRANSMISSION

(75) Inventors: Hiroyuki Sawada, Okazaki (JP); Masato Kaigawa, Toyota (JP); Shinya Toyoda, Nisshin (JP); Kei Kitajima, Toyota (JP); Yoshio Hasegawa, Chiryu (JP); Fuminori Monji, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 827 days.

(21) Appl. No.: 12/485,289

(22) Filed: Jun. 16, 2009

(65) Prior Publication Data
US 2010/0010716 A1    Jan. 14, 2010

(30) Foreign Application Priority Data
Jul. 14, 2008 (JP) ................................. 2008-183253

(51) Int. Cl.
*G06F 7/00* (2006.01)
(52) U.S. Cl. ............... 701/52; 477/25; 701/51; 475/117
(58) Field of Classification Search .............. 701/51, 701/52; 477/45, 50, 72, 76; 475/117
See application file for complete search history.

(56) References Cited

U.S. PATENT DOCUMENTS

| | | | |
|---|---|---|---|
| 5,556,349 A | | 9/1996 | Ishii et al. |
| 5,692,991 A | * | 12/1997 | Iwata et al. ................. 477/98 |
| 5,868,033 A | | 2/1999 | Nishino et al. |
| 5,947,856 A | * | 9/1999 | Tabata et al. ................. 475/128 |
| 5,957,807 A | * | 9/1999 | Takamatsu et al. ............. 477/98 |
| 5,957,809 A | * | 9/1999 | Jang ............................. 477/149 |
| 6,277,049 B1 | * | 8/2001 | Nishino ........................... 477/98 |
| 7,258,649 B2 | * | 8/2007 | Matsunaga et al. ........... 477/120 |
| 2003/0064855 A1 | * | 4/2003 | Tanaka et al. ................. 477/115 |
| 2004/0186645 A1 | * | 9/2004 | Kohno et al. ................... 701/51 |
| 2008/0077297 A1 | | 3/2008 | Ito et al. |
| 2008/0093137 A1 | * | 4/2008 | Maeda et al. ................. 180/65.2 |
| 2008/0153651 A1 | * | 6/2008 | Matsubara et al. ........... 475/151 |
| 2008/0182698 A1 | * | 7/2008 | Matsubara et al. ........... 475/151 |

(Continued)

FOREIGN PATENT DOCUMENTS
JP            4-254063         9/1992
(Continued)

*Primary Examiner* — Helal A Algahaim
(74) *Attorney, Agent, or Firm* — Oblon, Spivak, McClelland, Maier & Neustadt, L.L.P.

(57) ABSTRACT

A control device for an automatic transmission 10 having shift control means 88 operative to select a manual shift mode is provided for preventing acceleration response from deteriorating in the automatic transmission 10. The control device includes automatic up-range control means 90 for switching a range to a "D" range when high oil-temperature determining means determines presence of a high oil-temperature state, and high oil-temperature down-range permitting means 92 for permitting a down-range during a manual shift operation until a selected uppermost gear position $G_{SELECT}$ reaches a determining gear position $G_{JUGE}$ when the accelerator-on drive determining means 86 subsequently determines presence of an accelerator-on drive. Even when obtaining a drive force is attempted during an accelerator-on drive mode after switching the range, the down-range by the manual shift operation is permitted until the selected uppermost gear position $G_{SELECT}$ reaches the determining gear position $G_{JUGE}$. Thus, a drop in acceleration response in comparison to that of an automatic shift mode is prevented.

4 Claims, 14 Drawing Sheets

U.S. PATENT DOCUMENTS

| | | | |
|---|---|---|---|
| 2008/0207394 A1* | 8/2008 | Nakajima et al. | 477/107 |
| 2008/0208422 A1* | 8/2008 | Shibata et al. | 701/54 |
| 2008/0269010 A1* | 10/2008 | Matsubara et al. | 477/5 |
| 2009/0114464 A1* | 5/2009 | Imamura et al. | 180/65.285 |
| 2010/0044132 A1* | 2/2010 | Matsubara et al. | 180/65.285 |
| 2010/0174458 A1* | 7/2010 | Tsutsumi et al. | 701/52 |
| 2010/0179025 A1* | 7/2010 | Hyakutake | 477/125 |
| 2012/0072064 A1* | 3/2012 | Kumazaki et al. | 701/22 |
| 2012/0077639 A1* | 3/2012 | Shibata et al. | 477/20 |

FOREIGN PATENT DOCUMENTS

| | | |
|---|---|---|
| JP | 6-272754 | 9/1994 |
| JP | 8-193655 | 7/1996 |
| JP | 11-13873 | 1/1999 |
| JP | 11-311332 | 11/1999 |
| JP | 3196550 | 6/2001 |
| JP | 2003-207038 | 7/2003 |
| JP | 2007-170620 | 7/2007 |
| JP | 2008-75850 | 4/2008 |

* cited by examiner

|  | C1 | C2 | B1 | B2 | B3 | F1 |
|---|---|---|---|---|---|---|
| 1st | ○ |  |  | (○) |  | △ |
| 2nd | ○ |  | ○ |  |  |  |
| 3rd | ○ |  |  |  | ○ |  |
| 4th | ○ | ○ |  |  |  |  |
| 5th |  | ○ |  |  | ○ |  |
| 6th |  | ○ | ○ |  |  |  |
| Rev |  |  |  | ○ | ○ |  |
| N |  |  |  |  |  |  |
| (○) ENGAGED DURING ENGINE BRAKING ||||||||
| △ ENGAGED ONLY DURING DRIVING ||||||||

CONTROL DEVICE FOR VEHICULAR AUTOMATIC TRANSMISSION

This application is based on JP 2008-183253 filed on Jul. 14, 2008, and content there is incorporated herein for reference.

TECHNICAL FIELD

The present invention relates to a shift control for a vehicle having an automatic transmission, in which shift ranges or gear positions of the automatic transmission are switched one by one for each manual shift operation of a shift operation device, when a manual shifting mode is set.

BACKGROUND ART

An attempt has been made to provide a control device for a vehicular automatic transmission as described below. The control device includes shift control means operative to cause the automatic transmission to automatically switch a gear position within a range of a maximum shift-width based on a vehicle condition by referring to a preliminarily stored shifting diagram when an automatic shift mode is set. When a manual shift mode is set, the gear positions of the automatic transmission are switched to plural ranges in which a lower speed gear position lower in speed than that of the uppermost gear position in the range of the maximum shift-width is set as an uppermost gear position, one by one for each manual shift operation of a shift operation device, or they are switched one by one for each manual shift operation of the shift operation device. When a high oil-temperature state is present in which a working oil temperature in the automatic transmission exceeds a predetermined value, the manual shift mode is inhibited while a mode is automatically switched to the automatic shift mode. Shift control devices for vehicular automatic transmissions, disclosed in following Patent Publications 1 and 2, correspond to such a control device mentioned above.

[Patent Publication 1] Japanese Patent Publication No. 2007-170620

[Patent Publication 2] Japanese Patent Publication No. 11-311332

With the control device for the vehicular automatic transmission disclosed in Patent Publication 1, if working oil in the automatic transmission lies at a high temperature, the shifting is executed to a gear position selected in the manual shift mode with a further increasing frequency of downshifts than that of downshifts executed when working oil in the automatic transmission lies at a usual temperature. With the control device for the vehicular automatic transmission disclosed in Patent Publication 2, further, when the working oil temperature in the automatic transmission exceeds an appropriate range preliminary set, an upshift is commanded to a driver to automatically execute the upshift upon no initiation of such an upshift.

With the conventional control devices for the vehicular automatic transmissions set forth above, under a circumstance where temperature of the working oil in the automatic transmission exceeds a predetermined value and an accelerator pedal of a vehicle is depressed, the manual shift mode is sustained and the working oil temperature is lowered. To this end, for a manual shift mode of a so-called shift-range hold type, executing an automatic up-range control is considered in which a shift range of the automatic transmission is automatically up-ranged to the range of the maximum shift-width, and a down-range is inhibited. For another manual shift mode of a so-called gear-position hold type, executing an automatic upshift control is considered in which a gear position of the automatic transmission is automatically switched to the maximum speed gear position and the downshift is inhibited. With such controls, no attempt is made to positively switch the gear position of the automatic transmission to a low speed gear position. This results in a decrease in rotation speed of an input-side rotary member of the automatic transmission, thereby suppressing an temperature increase of the working oil due to the stirring of working oil.

In a vehicle including an automatic transmission arranged to execute the automatic up-range control or the automatic upshift control, however regarding the manual shift operation in the manual shift mode, there are drawbacks such as the manual shift operation becomes cumbersome and complicated, and favorable acceleration response can be hardly obtained. With a multi-gear positions automatic transmission, for instance, obtaining an engine braking is attempted during the vehicle running at a relatively low speed, after the automatic up-range control or the automatic upshift control is executed. In such a case, the downshift operations need to be repeatedly executed after depression-back of the accelerator pedal, until the shift range or the gear position of the automatic transmission reaches the shift range or the gear position in which the adequate engine braking can be obtained at the maximum shift-width range or the highest-speed gear position.

In the automatic transmission having the manual shift mode of the gear-position hold type, further, obtaining a drive force is attempted during a continuing depressive operation of the accelerator pedal after execution of the automatic upshift control. In this case, the downshift is inhibited as set forth above, and even when the vehicle lies in a speed range available to run at a low speed gear position, the vehicle can run only at the highest speed gear position. In the automatic transmission having the manual shift mode of the so-called shift-range hold type (upper limit gear position determining system), moreover, obtaining a drive force is attempted during the continuing depressive operation of the accelerator pedal after execution of the automatic upshift control. In this case, since the downshift is inhibited as set forth above, the vehicle can run only at the maximum shift-width range.

SUMMARY OF THE INVENTION

The present invention is completed with the above view in mind, and has an object to provide a control device for a vehicular automatic transmission that can prevent occurrence of cumbersome and complicated manual shift operation and occurrence of deterioration in acceleration response regarding the manual shift operation, during a manual shift mode in a vehicle in which the automatic transmission is operative to select the manual shift mode.

For achieving the above object, a first aspect of the present invention relates to a control device for a vehicular automatic transmission having (a) shift control means operative such that (i) with an automatic shift mode set, a gear position in the automatic transmission is automatically switched within a range of a maximum shift-width based on a vehicle condition by referring to a preliminarily stored shifting diagram, and (ii) with a manual shift mode set, the gear position is switched to plural ranges, one by one for each manual shift operation of a shift operation device, in which low-speed side gear positions lower than an uppermost gear position in the maximum shift-width range is set as the uppermost gear position.

The control device comprises (b) high oil-temperature determining means that determines whether temperature of a working-oil in the automatic transmission lies in a high oil-temperature state exceeding a oil-temperature determining value preliminary set; (c) accelerator-on drive determining means that determines whether an accelerator-on drive is present with an accelerator pedal of the vehicle depressed; (d) on-high oil-temperature automatic up-range control means that switches a shift range of the automatic transmission to the range of the maximum shift-width when the high oil-temperature determining means determines presence of the high oil-temperature state; and (e) on-high oil-temperature down-range permitting means that permits a down-range by the manual shift operation when the on-high oil-temperature automatic up-range control means switches the shift range of the automatic transmission to the maximum shift-width range and the accelerator-on drive determining means determines presence of the accelerator-on drive state, the on-high oil-temperature down-range permitting means permitting the down-range until the uppermost gear position in the range selected by the manual shift operation during the manual shift mode reaches a gear position determined based on the vehicle condition by referring to a high oil-temperature shifting diagram preliminary set in a lower speed side lower than that of the shifting diagram.

A second aspect of the present invention relates to a control device for a vehicular automatic transmission having (f) shift control means operative such that (i) with an automatic shift mode set, a gear position in the automatic transmission is automatically switched within a range of a maximum shift-width based on a vehicle condition by referring to a preliminarily stored shifting diagram, and (ii) with a manual shift mode set, the gear position is switched to plural ranges, one by one for each manual shift operation of a shift operation device, in which low-speed side gear positions lower than an uppermost gear position in the maximum shift-width range is set as the uppermost gear position.

The control device comprises (g) high oil-temperature determining means that determines whether temperature of a working-oil in the automatic transmission lies in a high oil-temperature state exceeding a oil-temperature determining value preliminary set; (h) accelerator-on drive determining means that determines whether an accelerator-on drive is present with an accelerator pedal of the vehicle depressed; and (i) on-high oil-temperature automatic up-range control means that switches a shift range of the automatic transmission when the high oil-temperature determining means determines presence of the high oil-temperature state and the accelerator-on drive determining means determines presence of the accelerator-on drive state, the on-high oil-temperature automatic up-range control means switching the shift range to a range in which a gear position, determined based on the vehicle condition by referring to a high oil-temperature shifting diagram preliminary set in a lower speed area lower than that of the shifting diagram, operates as the uppermost gear position.

A third aspect of the present invention relates to a control device for a vehicular automatic transmission having (j) shift control means operative such that (i) with an automatic shift mode set, gear positions in the automatic transmission are automatically switched within a range of a maximum shift-width based on a vehicle condition by referring to a preliminarily stored shifting diagram, and (ii) with a manual shift mode set, the gear positions in the automatic transmission are switched one by one for each manual shift operation of a shift operation device.

The control device comprises (k) high oil-temperature determining means that determines whether temperature of a working-oil in the automatic transmission lies in a high oil-temperature state exceeding a oil-temperature determining value preliminary set; (l) accelerator-on drive determining means that determines whether an accelerator-on drive is present with an accelerator pedal of the vehicle depressed; (m) on-high oil-temperature automatic upshift control means that switches the gear position of the automatic transmission to a maximum speed gear position when the high oil-temperature determining means determines presence of the high oil-temperature state; and (n) on-high oil-temperature downshift permitting means that permits a downshift to be executed in the manual shift operation when the automatic upshift control means switches the gear position of the automatic transmission to the maximum speed gear position and the accelerator-on drive determining means determines presence of the accelerator-on drive state, the on-high oil-temperature downshift permitting means permitting the downshift until a gear position selected by the manual shift operation during the manual shift mode reaches a gear position determined based on the vehicle condition by referring to a high oil-temperature shifting diagram preliminarily set in a lower speed area lower than that of the shifting diagram.

A fourth aspect of the present invention relates to a control device for a vehicular automatic transmission having (o) shift control means operative such that (i) with an automatic shift mode set, gear positions in the automatic transmission are automatically switched within a range of a maximum shift-width based on a vehicle condition by referring to a preliminarily stored shifting diagram, and (ii) with a manual shift mode set, the gear positions in the automatic transmission are switched one by one for each manual shift operation of a shift operation device.

The control device comprises (p) high oil-temperature determining means that determines whether temperature of a working-oil in the automatic transmission lies in a high oil-temperature state exceeding a oil-temperature determining value preliminary set; (q) accelerator-on drive determining means that determines whether an accelerator-on drive is present with an accelerator pedal of the vehicle being depressed; and (r) on-high oil-temperature automatic upshift control means that switches the gear position in the automatic transmission when the high oil-temperature determining means determines presence of the high oil-temperature state and the accelerator-on drive determining means determines presence of the accelerator-on drive state, the on-high oil-temperature automatic upshift control means switching the gear position to a gear position determined based on the vehicle condition by referring to a high oil-temperature shifting diagram preliminarily set in a lower speed area lower than that of the shifting diagram.

The control device for the vehicular automatic transmission of the first aspect comprises high oil-temperature determining means that determines whether temperature of a working-oil in the automatic transmission lies in a high oil-temperature state exceeding a oil-temperature determining value preliminary set; accelerator-on drive determining means that determines whether an accelerator-on drive is present with an accelerator pedal of the vehicle depressed; on-high oil-temperature automatic up-range control means that switches a shift range of the automatic transmission to the range of the maximum shift-width when the high oil-temperature determining means determines presence of the high oil-temperature state; and on-high oil-temperature down-range permitting means that permits a down-range by the manual shift operation when the on-high oil-temperature automatic up-range control means switches the shift range of the automatic transmission to the maximum shift-width range and the accelerator-on drive determining means determines presence of the accelerator-on drive state, the on-high oil-temperature down-range permitting means permitting the down-range until the uppermost gear position in the range selected by the manual shift operation during the manual shift mode reaches a gear position determined based on the vehicle condition by referring to a high oil-temperature shifting diagram preliminary set in a lower speed side lower than that of the shifting diagram.

Consequently, in the vehicle provided with the automatic transmission operative to select the manual shift mode with a so-called shift-range hold type, a drive force is obtained during a continuing accelerator-on drive after the on-high oil-temperature automatic up-range control means switched the shift range to the maximum shift-width range. To this end, the down range with the manual shift operation is permitted until the uppermost gear position reaches the gear position determined based on the vehicle condition by referring to the high oil-temperature shifting diagram, thereby preventing deterioration in an acceleration response in comparison to that of an automatic shift mode.

The control device for the vehicular automatic transmission of the second aspect comprises high oil-temperature determining means that determines whether temperature of a working-oil in the automatic transmission lies in a high oil-temperature state exceeding a oil-temperature determining value preliminary set; accelerator-on drive determining means that determines whether an accelerator-on drive is present with an accelerator pedal of the vehicle depressed; and on-high oil-temperature automatic up-range control means that switches a shift range of the automatic transmission when the high oil-temperature determining means determines presence of the high oil-temperature state and the accelerator-on drive determining means determines presence of the accelerator-on drive state, the on-high oil-temperature automatic up-range control means switching the shift range to a range in which a gear position, determined based on the vehicle condition by referring to a high oil-temperature shifting diagram preliminary set in a lower speed area lower than that of the shifting diagram, operates as the uppermost gear position.

Consequently, in the vehicle provided with the automatic transmission operative to select the manual shift mode with the so-called shift-range hold type, cumbersome and complicated manual shift operation can be prevented in the manual shift mode. That is, when the high oil-temperature state is present during the accelerator-on drive, none of the shift ranges is uniformly switched to the range of the maximum shift-width. Thus, when obtaining the engine braking is attempted after execution of the on-high oil-temperature automatic up-range control means, the adequate engine braking can be obtained by depressing-back the accelerator pedal or executing the down range about once after depressing-back of the accelerator pedal. Accordingly, even when obtaining the engine braking is attempted after execution of the on-high oil-temperature up-range control means, no needs arises to repeatedly execute the down-range operation.

The control device for the vehicular automatic transmission of the third aspect comprises high oil-temperature determining means that determines whether temperature of a working-oil in the automatic transmission lies in a high oil-temperature state exceeding a oil-temperature determining value preliminary set; accelerator-on drive determining means that determines whether an accelerator-on drive is present with an accelerator pedal of the vehicle depressed; on-high oil-temperature automatic upshift control means that switches the gear position of the automatic transmission to a maximum speed gear position when the high oil-temperature determining means determines presence of the high oil-temperature state; and on-high oil-temperature downshift permitting means that permits a downshift to be executed in the manual shift operation when the automatic upshift control means switches the gear position of the automatic transmission to the maximum speed gear position and the accelerator-on drive determining means determines presence of the accelerator-on drive state, the on-high oil-temperature downshift permitting means permitting the downshift until a gear position selected by the manual shift operation during the manual shift mode reaches a gear position determined based on the vehicle condition by referring to a high oil-temperature shifting diagram preliminarily set in a lower speed area lower than that of the shifting diagram.

Consequently, in the automatic transmission having the manual shift mode of the gear-position hold type, a drive force is obtained during a continuing accelerator-on drive after the on-high oil-temperature automatic up-range control means switched the shift range to the highest-speed gear. To this end, the down range by the manual shift operation is permitted until the selected gear position reaches the gear position determined based on the vehicle condition by referring to the high oil-temperature shifting diagram, thereby preventing deterioration in acceleration response in comparison to that of an automatic shift mode.

The control device for the vehicular automatic transmission of the fourth aspect comprises high oil-temperature determining means that determines whether temperature of a working-oil in the automatic transmission lies in a high oil-temperature state exceeding a oil-temperature determining value preliminary set; accelerator-on drive determining means that determines whether an accelerator-on drive is present with an accelerator pedal of the vehicle being depressed; and on-high oil-temperature automatic upshift control means that switches the gear position in the automatic transmission when the high oil-temperature determining means determines presence of the high oil-temperature state and the accelerator-on drive determining means determines presence of the accelerator-on drive state, the on-high oil-temperature automatic upshift control means switching the gear position to a gear position determined based on the vehicle condition by referring to a high oil-temperature shifting diagram preliminarily set in a lower speed area lower than that of the shifting diagram.

Consequently, in the vehicle including a multi-gear positions automatic transmission operative to select the manual shift mode of the so-called gear-position hold type, cumbersome and complicated manual shift operation can be prevented in the manual shift mode. That is, when the high oil-temperature state is present during accelerator-on drive, none of the gear positions is uniformly switched to the highest-speed gear position. Thus, when obtaining the engine braking is attempted after execution of the high oil-temperature automatic upshift control means, adequate engine braking can be obtained by depressing-back the accelerator pedal or executing the downshift about once after depressing-back of the accelerator pedal. Accordingly, even when obtaining the engine braking is attempted after execution of the on-high oil-temperature upshift control means, no needs arises to repeatedly execute the downshift operation.

Further, the manual shift mode may be of the type that can establish a so-called shift-range hold mode or a so-called gear-position hold mold, operative to arbitrarily alter the shift range or the gear position of the automatic transmission by the manual shift operation, which can be referred to as a sequential mode, manual mode or a sport mode, etc.

DETAILED DESCRIPTION OF THE PREFERRED EMBODIMENTS

Now, embodiments of the present invention will be described below in detail with reference to the accompanying drawings. Hereunder, the following embodiments are shown in suitably simplified or modified structures, and no components parts are necessarily described in accurate manner in respect of dimensional ratios and shapes, etc.

First Embodiment

Figures 1, 2:
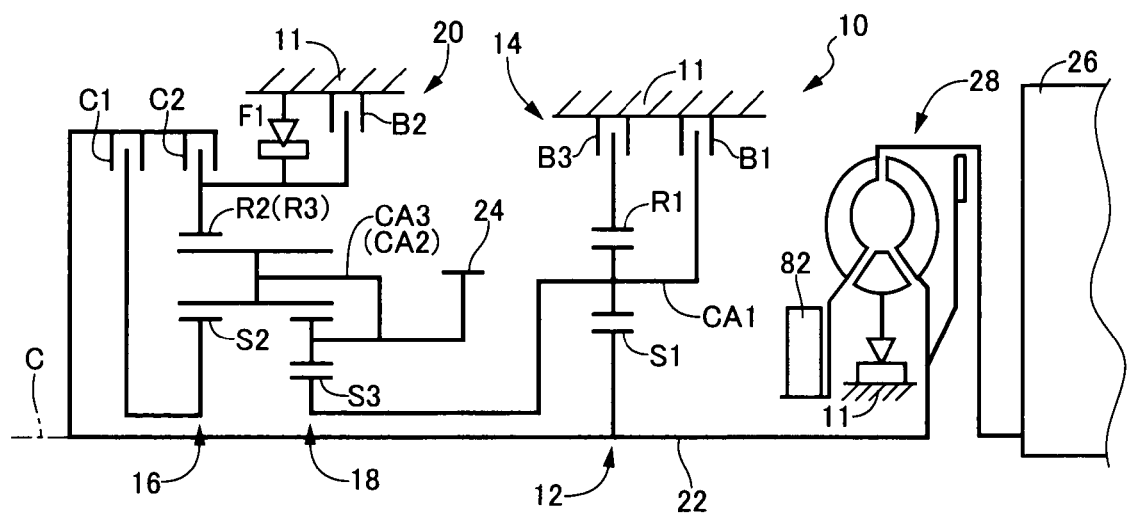
FIG. 1 is a skeleton view of a vehicular automatic transmission to which one embodiment according to the present invention is applied.
FIG. 2 is an engagement operation table illustrating engaging elements used when establishing a plurality of gear positions, i.e., operating states of frictional engaging devices.

FIG. 1 is a skeleton view illustrating an automatic transmission (vehicular automatic transmission) 10 of a vehicle to which one embodiment of the present invention is applied. FIG. 2 is an operation table illustrating operating states of engaging elements, i.e., friction engaging devices used for establishing a plurality of gear positions (shift positions). The automatic transmission 10, preferably applied to an FF vehicle for installation in a lateral direction (under a transverse state) of the vehicle, includes a transmission case 11 mounted on a vehicle body to serve as a non-rotary member. The transmission case 11 incorporates therein a first shift portion 14 mainly comprised of a first planetary gear set 12 of a single pinion type, and a second shifting portion 20 mainly comprised of a second planetary gear set 16 of a double pinion type, and a third planetary gear set 18 of a single pinion type formed in a Ravigneaux type. These component parts are disposed on a common center axis C to allow the rotation of an input shaft 22 to be output from an output gear 24 after shifted. The input shaft 22 corresponds to an input member of the automatic transmission 10, and in the present embodiment, also corresponds to a turbine shaft of a torque converter 28 acting as a hydrodynamic fluid coupling device rotatably driven by an engine 26 acting as a drive-force source for running the vehicle.

Figure 3:
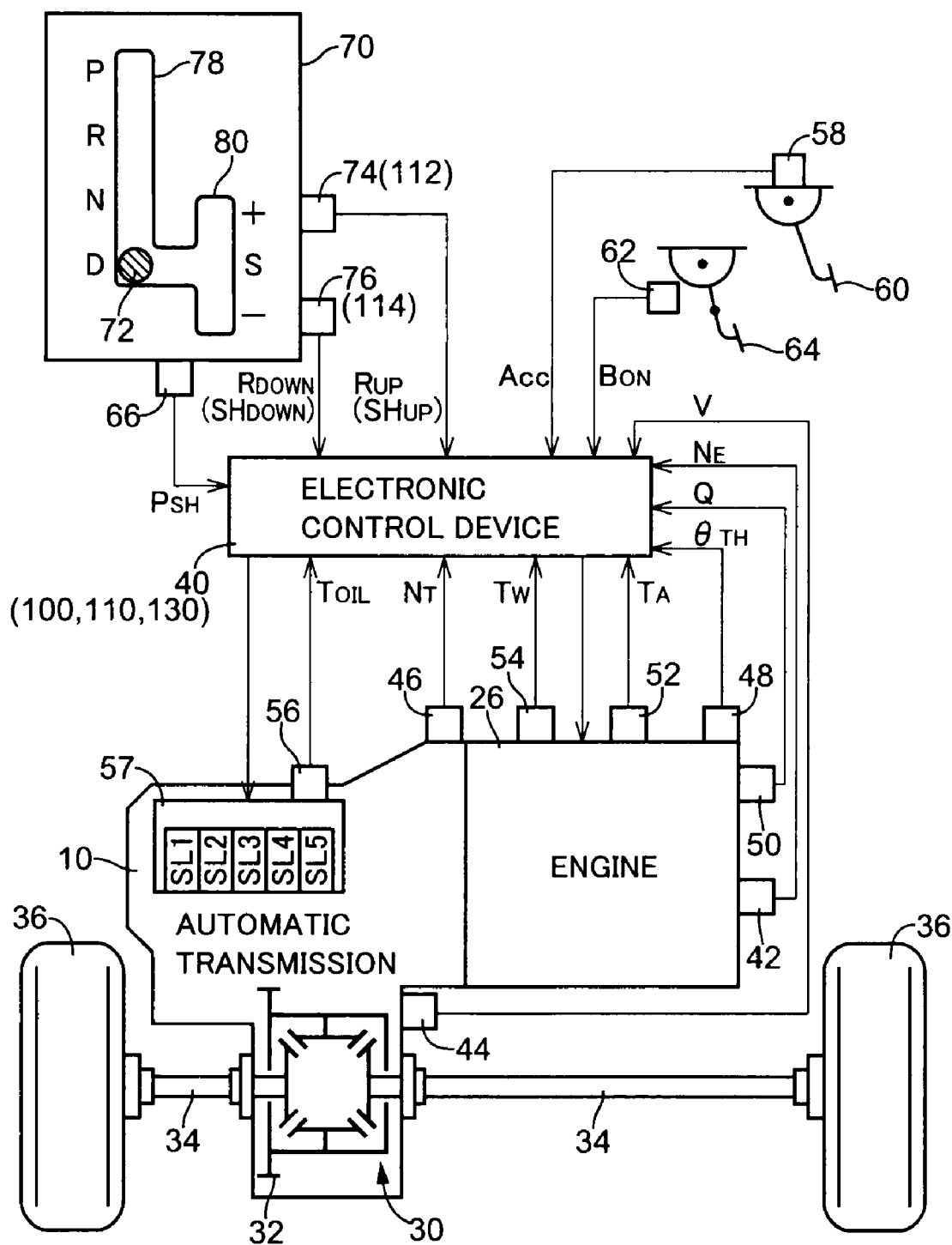
FIG. 3 is a block diagram illustrating a schematic structure of a power transmitting path between an engine and a pair of drive wheels, and a major part of control system mounted on a vehicle for controlling the automatic transmission, etc.

The output gear 24, corresponding to an output member of the automatic transmission 10, functions as a differential drive gear held in meshing engagement with a differential ring gear (differential driven gear) 32 for transmitting a drive force to a differential gear unit 30 shown in FIG. 3. A rotation speed sensor 44 shown in FIG. 3 detects a rotation speed $N_{OUT}$ [M/s] of the output gear 24 to supply a detection signal to an electronic control device 40 that will be described below. Upon receipt of such a rotation speed $N_{OUT}$, the electronic control device 40 calculate a vehicle speed V [km/h], which in turn is used for a shift determination.

In the automatic transmission 10 of such a structure, an output of the engine 26 is transferred to a pair of drive wheels 36 via the torque converter 28, the automatic transmission 10, the differential gear unit 30 and a pair of axles 34 shown in FIG. 3. In addition, the automatic transmission 10 and the torque converter 28 have a structure nearly symmetric with respect to the center axis C, and a lower half of the structure is herein omitted from the skeleton view of FIG. 1.

Clutches C1 and C2 and brakes B1 to B3 (hereinafter merely referred to as clutches C and brakes B unless otherwise specified) shown in FIG. 1, include hydraulic type friction engaging devices, such as multi-plate clutches and brakes, which are controllably engaged by hydraulic actuators. Energizing or deenergizing linear solenoid valves SL1 to SL5 incorporated in a hydraulic control circuit shown in FIGS. 3 and 4, and performing current controls thereof allow the clutches C and the brakes B to be switched in engaged or disengaged states, and control hydraulic pressures in transition between engaging and disengaging states. In the automatic transmission 10, the respective clutches C and brakes B are caused to selectively engage in a manner, as shown in the engagement operation table shown in FIG. 2, depending on an shifted position of a shift lever 72 of a shift operation device 70 shown in FIG. 3. Thus, in the automatic transmission 10, respective rotary elements (sun gears S1 to S3, carriers CA1 to CA3 and ring gears R1 to R3) of the first shifting portion 14 and the second shifting portion and 20 are coupled, thereby establishing one of six forward-drive gear positions, including a 1st-speed gear position "1st" to a 6th-speed gear position "6th", and one reverse-drive gear position "R".

The operation table, shown in FIG. 2, represents compiled relationships between the various gear positions being established and the operating states of the clutches C and the brakes B, with a symbol "o" representing an engaged state, and "(o)" representing an engaged state achieved only during engine braking. As shown in FIG. 2, for the forward-drive gear positions, engaging the clutch C1 and the brake B2 allows the 1st-speed gear position "1st" to be established and engaging the clutch C1, and the brake B1 allows the 2nd-speed gear position "2nd" to be established. Engaging the clutch C1 and the brake B3 allows the 3rd-speed gear position "3rd" to be established, and engaging the clutches C1 and C2 allows the 4th-speed gear position "4th" to be established. Engaging the clutch C2 and the brake B3 allows the 5th-speed gear position "5th" to be established, and engaging the clutch C2 and the brake B1 allows the 6th-speed gear position "6th" to be established. Moreover, engaging both of the brakes B2 and B3 allows the reverse-drive gear position "Rev" to be established, and disengaging all of the clutches C1 and C2 and all of the brakes B1 to B3 allows a neutral state to be established.

A one-way clutch F1 is provided in parallel to the brake B2 for establishing the 1st-speed gear position "1st". Therefore, only the clutch C1 is caused to engage for startup or acceleration of the vehicle, and the clutch C1 and the brake B2 are caused to engage when attempting to cause engine braking to act. The respective gear positions have speed ratios (=rotation speed of input shaft 22/rotation speed of output gear 24) that are suitably determined depending on various gear ratios (=the number of teeth of the sun gear/the number of teeth of the ring gear) of each of the first planetary gear unit 12, the second planetary gear unit 16 and the third planetary gear unit 18.

In the automatic transmission 10 of the present embodiment formed in such an arrangement, selectively engaging the plural engaging elements, i.e., the clutches C1 and C2 and the brakes B1 to B3 results in a consequence of establishing a plurality of gear positions with different speed ratios. As will be apparent from the operation table shown in FIG. 2, the gear positions can be switched upon performing a so-called clutch-to-clutch shifting to cause either two of the clutches C1 and C2 and the brakes B1 to B3 to be changeably coupled.

FIG. 3 is a block diagram illustrating an overall structure of a power transfer path between the engine 26, shown in FIG. 1, and the pair of drive wheels 36 and a major part of a control system installed on the vehicle for controlling the automatic transmission 10. In FIG. 3, the electronic control device 40 is comprised of a so-called microcomputer provided with, for example, CPU, RAM, ROM and input/output interfaces, etc. The CPU is arranged to perform signal processing in accordance with programs preliminarily stored in ROM while utilizing a temporary storage function of RAM, thereby performing output control of the engine 26 and shifting control, etc., of the automatic transmission 10. The electronic control device 40 has divided structures in category for the output control of the engine 26 and the shifting control, etc., of the automatic transmission 10 depending on needs.

The electronic control device 40 is supplied with various signals including: a signal representing an engine revolutions $N_E$ [m/s] indicative of a rotation speed of the engine 26 detected by an engine rotation speed sensor 42; a vehicle speed signal representing a rotation speed $N_{OUT}$ of the output gear 24, corresponding to a vehicle speed V, which is detected by the vehicle speed sensor 44; a signal representing a turbine rotation speed $N_T$ [m/s], indicative of a rotation speed of the turbine shaft of the torque converter 28 detected by a turbine rotation-speed sensor 46, i.e., a rotation speed of the input shaft 22 of the automatic transmission 10; a throttle opening signal representing a throttle opening $\theta_{TH}$ [°] indicative of an opening degree of an electronic throttle valve for regulating an intake air quantity Q [m³] of the engine 26 and detected by a throttle valve opening sensor 48; a signal representing the intake air quantity Q of the engine 26 detected by an intake air quantity sensor 50; a signal representing an intake air temperature $T_A$ [°] detected by an intake-air temperature sensor 52; and a signal representing a cooling water temperature $T_W$ [°] of the engine 26 detected by a cooling water temperature sensor 54, etc.

The electronic control device 40 is further supplied with additional signals including: a working-oil temperature signal representing a working-oil temperature $T_{OIL}$ [°] indicative of a temperature of working oil in the hydraulic control circuit 57; an accelerator-opening signal representing an accelerator-opening Acc [°] indicative of a depressed stroke of an accelerator pedal 60 detected by an accelerator-opening sensor 58; a signal representing an operation $B_{on}$ indicative of a foot brake (wheel brake) functioning as a usually operated brake and placed under operation, i.e., a foot brake pedal 64 being placed under a depressed operation and detected by a brake switch 62; a signal representing a lever position (operated position or shifted position) $P_{SH}$ of the shift lever 72 of the shift operation device 70, operative to function as a device to operate a power transfer state of the automatic transmission 10 and an input device for a manual shift operation, which is detected by a lever position sensor 66; a signal representing an up-range command $R_{UP}$ for a shift range, initiated with the manual shift operation of the shift operation device 70, which is detected by an up-range switch 74; and a signal representing a down-range command $R_{DOWN}$ for the shift range initiated with the manual shift operation of the shift operation device 70, which is detected by a down-range switch 76, etc.

The electronic control device 40 delivers various output signals including: a drive signal applied to a throttle actuator for controlling the throttle valve opening $\theta_{TH}$ of the electronic throttle valve; an ignition timing signal applied to an ignition device for controlling ignition timing of the engine 26; a fuel supply quantity signal for controlling a quantity of fuel being injected from a fuel injection device to the engine 26 for supplying fuel into an intake pipe or a cylinder of the engine 26; valve drive command signals for driving linear solenoid valves SL1 to SL5 incorporated in the hydraulic control circuit 57 for switching the gear positions in the automatic transmission 10; and a command signal applied to a hydraulic pressure supply device for controlling a hydraulic line pressure PL supplied to the linear solenoid valves SL1 to SL5 incorporated in the hydraulic control circuit 57, etc.

The shift operation device 70 is mounted in an area close proximity to, for instance, a driver's seat to be operated by a driver. As shown in FIG. 3, the shift lever 72 can be shifted to one of: four shifting positions located in a first shifting channel 78 formed along a fore and aft direction of the vehicle, i.e., a parking command position "P", a reverse-drive command position "R", a neutral command position "N" and an automatic shift command position "D"; and three shifting positions arranged in a second shafting channel 80 extending in parallel to the first shifting channel 78, i.e., a manual shift command position "S", an up-range command position "+" and a down-range command position "−". The shift operation device 70 further includes: the lever position sensor 66 operative to detect a lever position $P_{SH}$ of the shift lever 72; the up-range sensor 74 operative to detect if the shift lever 72 is shifted to the up-range command position "+"; and the down-range switch 76 operative to detect if the shift lever 72 is shifted to the down-range command position "−".

Further, the first shifting channel 78 and second shifting channel 80 are connected to each other via the lever positions "D" and "S". Even if the shift lever 72 is shifted to the up-range command position "+" or the down-range command position "−", it is automatically restored to the lever position "S" due to an urging force of a spring (not shown) for a subsequent non-shifting state. The shift operation device 70 is operative to electrically detect a shifted motion of the shift lever 72 to generate various commands depending on the shifted position. These commands include an up-range command $R_{UP}$ causing the lever position $P_{SH}$ or the shift range to be set to an up-range each time the shift lever 72 is shifted to the up-range command position "+"; or a down-range command $R_{DOWN}$ causing the shift range to be set to a down-range each time the shift lever 72 is shifted to the down-range command position "−", etc.

The parking command position "P" represents an operation position for the power transfer path of the automatic transmission 10 to be interrupted, and for the rotation of the output gear 24 to be mechanically blocked (locked) by a mechanical parking mechanism (not shown). The reverse-drive command position "R" represents an operation position for the gear position in the automatic transmission 10 to be switched to the reverse-drive gear position "Rev". The neutral command position "N" represents an operation position for the automatic transmission 10 to be placed in a neutral state for interrupting the power transfer path of the automatic transmission 10. The automatic shift command position "D" represents an operation position for an automatic shift mode to be established to automatically perform shift control among all of the gear positions, i.e., a "D" range (maximum-shift width range) including the 1st-speed gear position "1st" to the 6th-speed "6th" gear position in the present embodiment. The manual shift command position "S" represents a shifted position for a manual shift mode to be established enabling a manual shift by switching a gear position among a "1" range to a "D" range including plural ranges, i.e., the "1" range to a "5" range, with an upper-limit gear position of the shift range in the forward-drive gear positions being limited.

The "1" range, the "2" range, the "3" range, the "4" range or the "5" range have the shift ranges set to the 1st-speed gear position "1st", the 1st-speed gear position "1st" to the 2nd-speed gear position "2nd", the 1st-speed gear position "1st" to the 3rd-speed gear position "3rd", the 1st-speed gear position "1st" to the 4th-speed gear position "4th" or the 1st-speed gear position "1st" to the 5th-speed gear position "5th", respectively. That is, the "1" range to the "5" range represent the ranges in which the uppermost gear position includes a lower speed gear position lower in speed than that of the 6th-speed gear position "6th" constituting the uppermost gear position of the "D" range.

Figure 4:
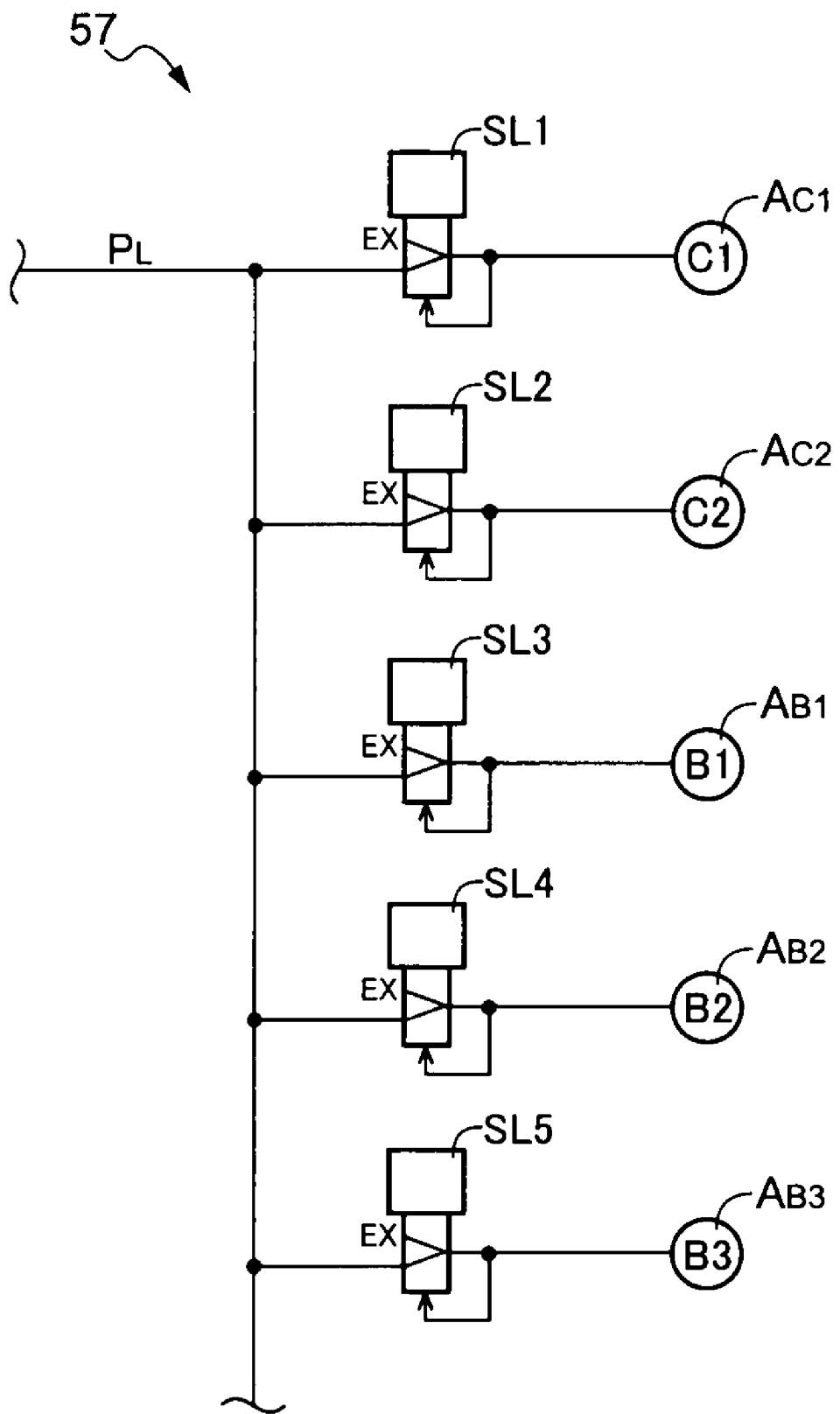
FIG. 4 is a hydraulic circuit diagram related to linear solenoid valves for controlling operations of respective hydraulic actuators disposed in clutches and brakes forming a part of a hydraulic control circuit shown in FIG. 3.

FIG. 4 is a hydraulic control circuit diagram related to the linear solenoid valves SL1 to SL5 for controlling operations of hydraulic actuators (hydraulic cylinders) $A_{C1}$, $A_{C2}$, $A_{B1}$, $A_{B2}$ and $A_{B3}$ incorporated in the clutches C1 and C2 and the brakes B1 to B3 of the component parts of the hydraulic control circuit 57. In FIG. 4, the linear solenoid valves SL1 to SL5 are basically arranged in structures identical to each other. With the electronic control device 40 arranged to energize or deenergize the linear solenoid valves SL1 to SL5 while performing current controls of these valves independently from one another, an original pressure in the form of the line hydraulic pressure PL is continuously used to controllably and independently regulate hydraulic pressures to be supplied to the hydraulic actuators $A_{C1}$, $A_{C2}$, $A_{B1}$, $A_{B2}$ and $A_{B3}$, respectively. This allows engaging pressures of the clutches C and the brakes B to be controlled, respectively.

The line hydraulic pressure PL uses the original pressure in the form of a hydraulic pressure delivered from a mechanical oil pump 82 that is rotatably driven by the engine 26. A relief-type regulator valve (regulator valve: not shown) is arranged to regulate the line hydraulic pressure PL at a level depending on an engine load, etc., which is represented in terms of the accelerator-opening Acc or the throttle valve opening $\theta_{TH}$. The automatic transmission 10 establishes the respective gear positions with the linear solenoid valves SL1 to SL5 rendered operative to cause predetermined ones of the clutches C and the brakes B to engage in a manner shown in the engagement operation table shown in FIG. 2.

Figure 5:
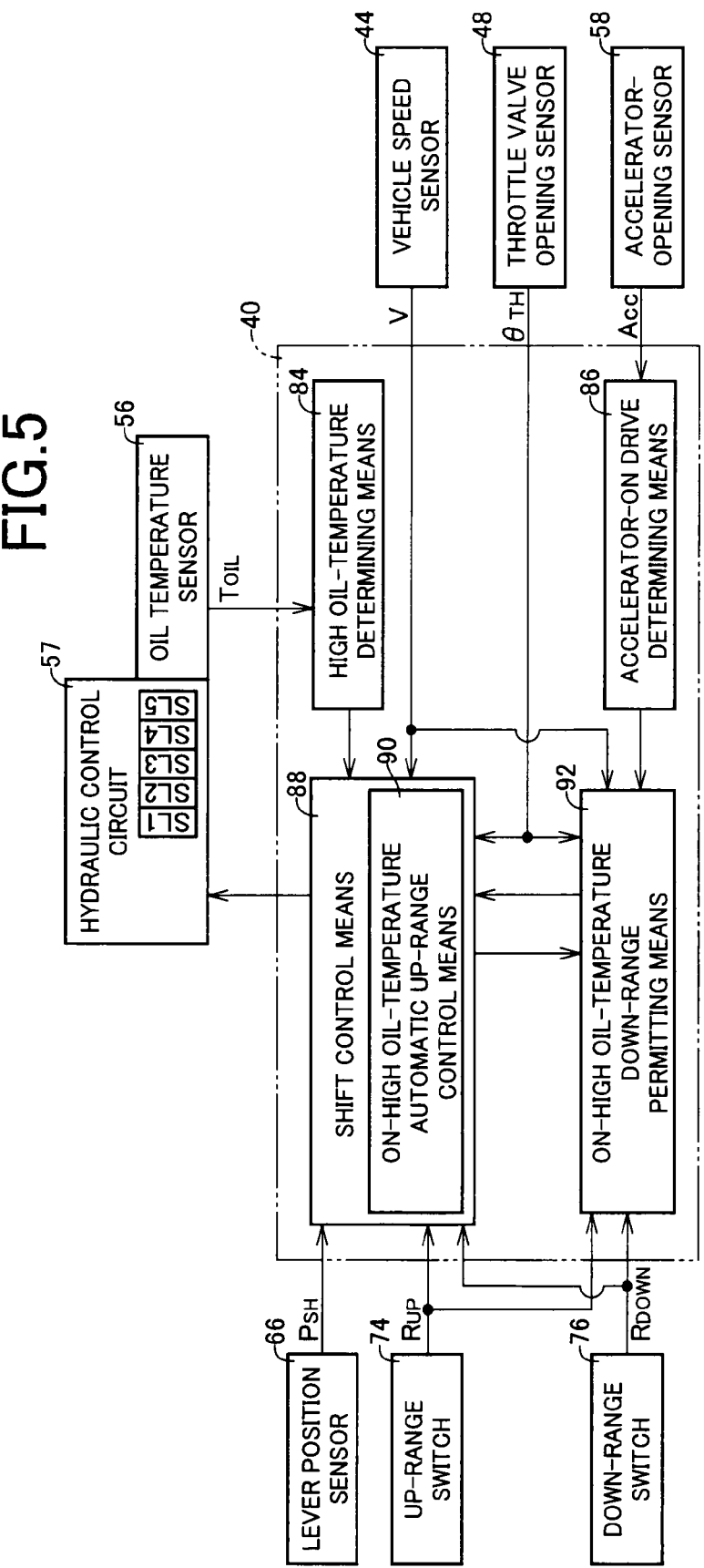
FIG. 5 is a functional block diagram illustrating a major part of a control function of an electronic control device shown in FIG. 3, which functions as a control device of the automatic transmission.

FIG. 5 is a functional block diagram illustrating a major part of a control function to be performed by the electronic control device 40 also operative to serve as a control device of the automatic transmission 10. In FIG. 5, high oil-temperature determining means 84 determines if a working-oil temperature $T_{OIL}$, prevailing in the automatic transmission 10, lies at a high oil-temperature state that exceeds a predetermined oil-temperature determining value $T_{OIL}1$. In the illustrated embodiment, the working-oil temperature $T_{OIL}$ represents a temperature of working oil in the hydraulic control circuit 57 detected by the oil temperature sensor 56. However, the present invention is construed not to be limited to such a temperature, and the working-oil temperature $T_{OIL}$ may include a temperature of working oil in for instance the torque converter 28. In addition, the oil-temperature determining value $T_{OIL}1$ is a value that is preliminarily obtained on experimental tests as a temperature of working oil needed for minimizing heat generation amount of power of the automatic transmission 10.

Accelerator-on drive determining means 86 determines if the accelerator-opening Acc exceeds a predetermined accelerator-on drive determining value Acc1, i.e., if there exists an accelerator-on drive state indicative of an accelerator pedal 60 of the vehicle being depressed. In the present embodiment, the accelerator-on drive determining value Acc1 is set to be 0 [%], the present invention is construed not to be limited to such a value. The accelerator-on drive determining value Acc1 may be set to a value of approximately, for instance, 1 to 5 [%] or suitably set to another value. In the present embodiment, further, although the presence of the accelerator-on drive state is discriminated with the accelerator-opening Acc detected by the accelerator-opening censer 58, the present invention is construed not to be limited to such a parameter, and the presence of the accelerator-on drive state may be determined depending on, for instance, the throttle valve opening $\theta_{TH}$ and the intake air quantity Q.

Figure 6:
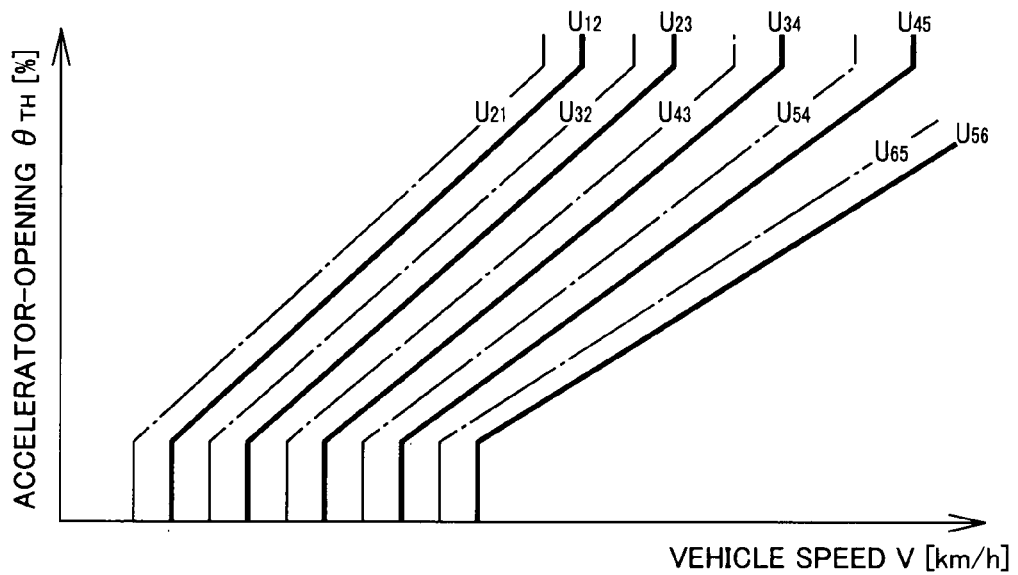
FIG. 6 is a view showing a basic shifting diagram, having a plurality of shifting lines determined on a two dimensional coordinate between a vehicle speed axis and a throttle opening axis, based on which whether to perform a shift between respective gear positions is determined.
Figure 7:
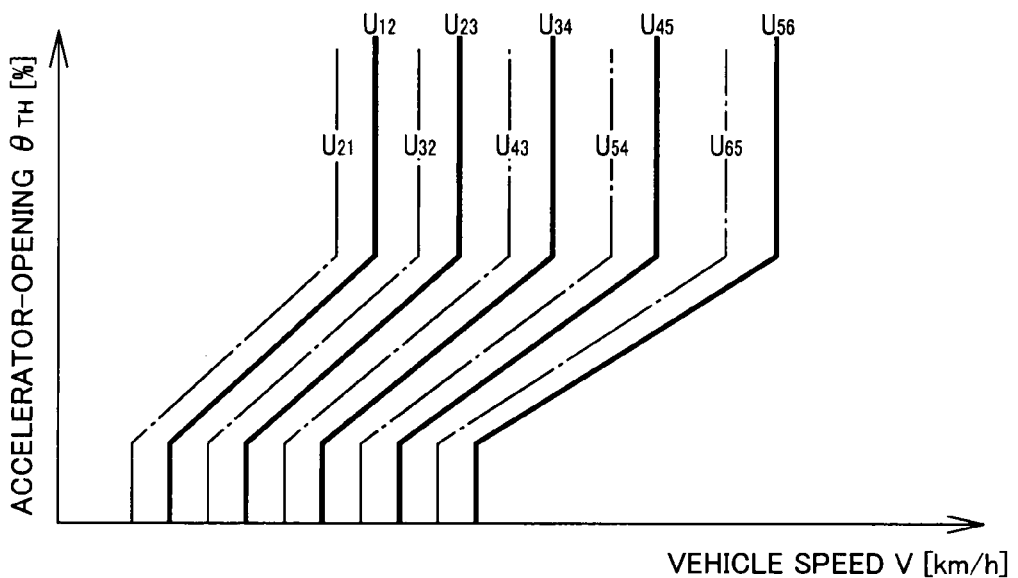
FIG. 7 is a high oil-temperature shifting diagram with the shift lines set to lower vehicle speed sides lower than those of the basic shifting diagram.

When an automatic shift mode is set, shift control means 88 determines a shift based on a vehicle speed V and the throttle valve opening $\theta_{TH}$ by referring to preliminarily stored shifting diagrams shown in FIGS. 6 and 7, respectively, to automatically switch the gear positions within the "D" range of the automatic transmission 10. The vehicle speed V and the throttle valve opening $\theta_{TH}$ correspond to a vehicle status value representing a vehicle condition that is plotted on a shifting diagram in the form of an orthogonal coordinate between an axis indicating the vehicle speed V and an axis indicating the throttle valve opening $\theta_{TH}$. In addition, the "D" range corresponds to a maximum shift-width range involving entire gear positions, i.e., the 1st-speed gear position "1st" to the 6th-speed gear position "6th". The shifting diagrams include a basic shifting diagram shown in FIG. 6, and a high oil-temperature shifting diagram shown in FIG. 7 which has shifting lines set to be lower in speed than those of shifting lines of the basic shifting diagram.

As shown in FIGS. 6 and 7, the basic shifting diagram and the high oil-temperature shifting diagram include plural shifting lines for determining whether to initiate the shifting between the gear positions set on a two dimensional coordinate between a vehicle speed axis and a throttle opening axis. These shifting lines are preliminarily obtained on experimental tests. In the present embodiment, when the high oil-temperature determining means 84 determines that the working oil temperature $T_{OIL}$ in the automatic transmission 10 remains out of the high oil-temperature state, the basic shifting diagram shown in FIG. 6 is used. However, if the working oil temperature $T_{OIL}$ in the automatic transmission 10 lies in the high oil-temperature state is determined, then the basic shifting diagram is switched to the high oil-temperature shifting diagram shown in FIG. 7. Various modes may be employed to allow such a shift determination to be made. For instance, the shift determination may be made based on, in addition to the throttle valve opening $\theta_{TH}$, the accelerator-opening Acc, the intake air quantity Q and a road surface gradient, etc.

In FIGS. 6 and 7, the shifting lines plotted on solid lines represent upshift lines based on which whether to initiate an upshift is determined, and the shifting lines plotted on single dot lines represent downshift lines based on which whether to initiate a downshift is determined. The upshift lines specify shift timing at which the shifting is initiated to a high vehicle speed area. That is, in the shifting diagrams shown in FIGS. 6 and 7, a position of a vehicle running state, specified in terms of an actual vehicle speed V and the throttle valve opening $\theta_{TH}$, moves relatively across, for instance, a 5→6 shift line $U_{56}$ to a high vehicle speed area. In such a case, the shift control means 88 determines that the 5th-speed gear position "5th" needs to be shifted to the 6th-speed gear position "6th", upon which the brake B3 is caused to disengage while the clutch C2 is caused to engage, as indicated on the operation table shown in FIG. 2.

If the position indicative of the vehicle running state moves across a 1→2 shift line $U_{12}$, a 2→3 shift line $U_{23}$, a 3→4 shift line $U_{34}$ or a 4→5 shift line $U_{45}$ to the high vehicle speed area, then, the shift control means 88 determines that a need arises to be shifted to the 2nd-speed gear position "2nd", the 3rd-speed gear position "3rd", the 4th-speed gear position "4th" or the 5th-speed gear position "5th". In this case, the clutches C and the brakes B are controllably caused to engage as indicated on the operation table shown in FIG. 2. Likewise, the downshift lines specify shift timing at which the shifting is initiated to a low vehicle speed area. That is, in the shifting diagrams shown in FIGS. 6 and 7, the position of the vehicle running state, specified with the actual vehicle speed V and the throttle valve opening $\theta_{TH}$, moves relatively across, for instance, a 6→5 shift line $U_{65}$ to a low vehicle speed area. In such a case, the shift control means 88 determines that the 6th-speed gear position "6th" needs to be shifted to the 5th-speed gear position "5th", upon which the brake B1 is caused to disengage while the brake B3 is caused to engage, as indicated on the operation table shown in FIG. 2. Moreover, if the position indicative of the vehicle running state moves across a 2→1 shift line $U_{21}$, a 3→2 shift line $U_{32}$, a 4→3 shift line $U_{43}$ or a 5→4 shift line $U_{54}$ to the low vehicle speed area, then, the shift control means 88 determines that a need arises to be shifted to the 1st-speed gear position "1st", the 2nd-speed gear position "2nd", the 3rd-speed gear position "3rd" or the 4th-speed gear position "4th". In this case, the clutches C and the brakes B are controllably caused to engage.

When a manual shift mode is set, the shift control means 88 allows the shift range to be switched to plural gear positions, i.e., the "1" range to the "D" range, including the "1" range to the "5" range, one by one for each manual shift operation of the shift operation device 70. In the "1" range to the "5" range, the lower speed gear position lower in speed than that of the 6th-speed gear position "6th" constituting the uppermost gear position of the "D" range is set as the uppermost gear position. That is, in the present embodiment, the manual shift mode is of a so-called shift-range hold type in which a shift range of the automatic transmission 10 is switched to plural ranges with an upper limit of the shift range being limited for each manual shift operation. During the vehicle running in for instance the "D" range, if the down-range switch 76 detects a signal representing the down-range command $R_{DOWN}$, then a down-range is initiated from the "D" range to the "5" range. During the vehicle running at the 6th-speed gear position "6th" lying at the uppermost gear position of the "D" range before the initiation of the down-range, a downshift is initiated to the 5th-speed gear position "5th" constituting the uppermost gear position of the "5" range. In addition, during the vehicle running remaining in the "5" range, the "4" range, the "3" range or the "2" range, if the signal representing the down-range command $R_{DOWN}$ is detected, then the down-range is initiated to the "4" range, the "3" range, the "2" range or "1" range. During the vehicle running under the uppermost gear position before the initiation of the down-range, the downshift is initiated to the uppermost gear position subsequent to the initiation of the down-range.

During the vehicle running under the "5" range, if the up-range switch 74 detects the signal representing the up-range command $R_{up}$, then the up-range is initiated from the "5" range to the "D" range. Before the initiation of the up-range, if the position of the vehicle running state specified with the actual vehicle speed V and the throttle valve opening $\theta_{TH}$ plotted on the shifting diagram lies at a position in a vehicle speed area higher than that of the 5→6 shift line $U_{56}$, an upshift is initiated from the 5th-speed gear position "5th" to the 6th-speed gear position "6th". During the vehicle running under the "4" range, the "3" range, the "2" range or "1" range, further, if the signal representing the down-range command $R_{DOWN}$ is detected, then the down-range is initiated to the "5" range, the "4" range, the "3" range or the "2" range. Before the initiation of the up-range, if the position of the vehicle running state, plotted on the shifting diagram, lies at a position in a vehicle speed area higher than that of the 4→5 shift line $U_{45}$, the 3→4 shift line $U_{34}$, the 2→3 shift line $U_{23}$ or the 1→2 shift line $U_{12}$, the upshift is initiated to the uppermost gear position subsequent to the initiation of the up-range.

Further, the shift control means 88 includes on-high oil-temperature automatic up-range control means 90. Under a circumstance where the manual shift mode is set and the high oil-temperature determining means 84 determines that the working oil temperature $T_{OIL}$ in the automatic transmission 10 lies in a high oil-temperature state, the high oil-temperature automatic up-range control means 90 allows the automatic transmission 10 to switch the shift range to the "D" range. The operation of the high oil-temperature automatic up-range control means 90 to perform such a switching is executed in priority to the manual shift operation accompanied by the down-range or the up-range. As long as the manual shift mode is set and the high oil-temperature determining means 84 determines the high oil-temperature state of the working oil temperature $T_{OIL}$ in the automatic transmission 10, on-the high oil-temperature automatic up-range control means 90 does not accept the manual shift operation, unless a predetermined condition is satisfied. As used herein, the term "predetermined condition" refers to a state under which the vehicle is running with an accelerator pedal being released, i.e., the accelerator-opening Acc being 0 [%], and the vehicle speed V lies at a predetermined downshift permitting vehicle speed V1 or less, or another state in which on-high oil-temperature down-range permitting means 92 permits the down range to be set.

Turning back to FIG. 5, the on-high oil-temperature automatic up-range control means 90 allows the automatic transmission 10 to switch the shift range to the "D" range, and the accelerator-on drive determining means 86 determines that the vehicle is running under the accelerator-on drive state. In this case, the on-high oil-temperature down-range permitting means 92 permits the down-range to be set by the manual shift operation. During such a manual shift operation, the down-range is permitted until the uppermost gear position selected by the manual shift operation, i.e., a selected-range uppermost gear position $G_{SELECT}$, reaches a gear position, i.e., a determining gear position $G_{JUGE}$ determined based on an actual vehicle speed V and the throttle valve opening $\theta_{TH}$. The actual vehicle speed V and the throttle valve opening $\theta_{TH}$ are determined by referring to a predetermined high oil-temperature shifting diagram in which the respective down-range permitting regions ("3" range permitting region A3, "4" range permitting region A4 and "5" range permitting region, etc.) are set in advance as shown in FIG. 8.

Figure 8:
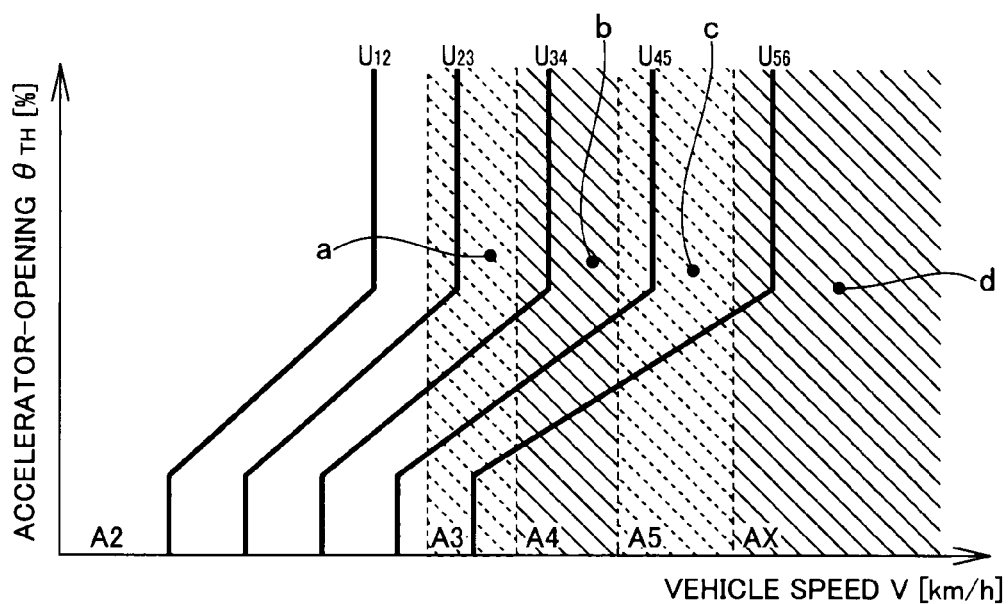
FIG. 8 is a view showing one example of a high oil-temperature shifting diagram in which a plurality of down-range permitting regions are preliminarily determined.

On the high oil-temperature shifting diagram shown for instance in FIG. 8, when the position of the vehicle running state, specified with the actual vehicle speed V and the throttle valve opening $\theta_{TH}$, falls in a position inside the "3" range permitting region A3 as indicated at for instance a point "a", the determining gear position $G_{JUGE}$ is set to "3" (3rd-speed gear position "3rd") for permitting the down-range to be initiated in the "3" range in which the uppermost gear position lies at the 3rd-speed gear position "3rd". Further, when the position of the vehicle running state falls in a position inside the "4" range permitting region A4 as indicated at for instance a point "b", the determining gear position $G_{JUGE}$ is set to "4" (4th-speed gear position "4th") to permit the down-range to be initiated in the "4" range with the uppermost gear position lying at the 4th-speed gear position "4th". Furthermore, when the position of the vehicle running state falls in a position inside the "5" range permitting region A5 as indicated at for instance a point "c", the determining gear position $G_{JUGE}$ is set to "5" (5th-speed gear position "5th") to permit the down-range to be initiated in the "5" range with the uppermost gear position lying at the 5th-speed gear position "5th".

Moreover, when the position of the vehicle running state falls in a position inside a down-range inhibiting region AX as indicated at for instance a point "d", the determining gear position $G_{JUGE}$ is set to "6" (6th-speed gear position "6th") and no down-range is permitted with the "D" range being sustained. Here, in the present embodiment, the down-range is permitted up to the "3" range in the same range as that of the "3" range permitting region A3, when the position representing the vehicle running state lies in the low vehicle speed region A2 at a vehicle speed lower than that of the "3" range permitting region A3 in FIG. 8. However, the present invention is construed not to be limited to such a region, and a "2" range permitting region for the down-range to be permitted up to the "2" range or the "1" range permitting region for the down-range to be permitted up to the "1" range may be set. In addition, each of the down-range permitting regions (the "3" range permitting region A3, the "4" range permitting region A4, the "5" range permitting region A5 and the low vehicle speed region A2) and the down-range inhibiting region AX are preliminarily obtained on experimental tests for storage.

Now, a control operation of the on-high oil-temperature down-range permitting means 92 will be concretely described below in detail. First, the on-high oil-temperature down-range permitting means 92 determines if the position of the vehicle running state, specified with the actual vehicle speed V and the throttle valve opening $\theta_{TH}$ plotted on the shifting diagram, belongs to any one of the "3" range permitting region A3 (low vehicle speed range A2), the "4" range permitting region A4, the "5" range permitting region A5 or the down-range inhibiting region AX. Based on such determination, the determining gear position $G_{JUGE}$ to "3", "4", "5" or "6" are allocated.

Figure 9:
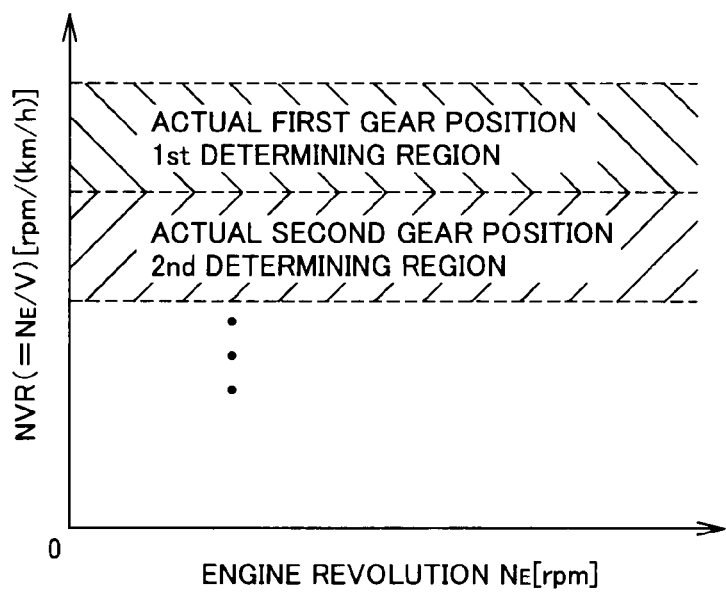
FIG. 9 is a view showing an actual gear-position calculating map representing a preliminarily stored relationship including a plurality of determining regions set on a two dimensional coordinate between an engine revolution axis and a NVR axis.

Subsequently, the on-high oil-temperature down-range permitting means 92 calculates an real gear position, i.e., a real gear position $G_{NOW}$ present in the automatic transmission 10 based on an actual engine revolutions $N_E$ and the vehicle speed V. The calculation is performed by referring to a preliminarily stored relationship, i.e., an actual gear-position calculation map, having a plurality of determining regions set on a two-dimensional coordinate between an engine revolution axis and an NVR axis such as that shown, for instance, in FIG. 9. In FIG. 9, a horizontal axis represents the engine revolutions $N_E$ and the longitudinal axis represents a value obtained by dividing the engine revolutions $N_E$ by the vehicle speed V, i.e., an NVR value. Besides, the relationship mentioned above is preliminarily obtained on experimental tests.

In the actual gear-position calculation map shown in FIG. 9, the plural determining regions are determined for each of the gear positions, respectively. If the position specified on the actual gear position with the actual engine revolutions $N_E$ and the vehicle speed V lies in the first gear position determining region among the plural determining regions, then a real i.e., an actual gear position $G_{REAL}$ belongs to the 1st-speed gear position or not is determined. Further, if the position specified on the actual gear-position calculation map lies in a second gear position determining region, a third gear position determining region, a fourth gear position determining region, a fifth gear position determining region or a sixth gear position determining region, then a determination is made that the real gear position $G_{REAL}$ belongs to the second gear position, the third gear position, the fourth gear position, the fifth gear position or the sixth gear position. The actual gear-position calculation map has the first and second gear position determining regions shown in FIG. 9, with the third to sixth gear position determining regions herein omitted.

Next, the selected-range uppermost gear position $G_{SELECT}$ is determined based on the real gear position $G_{NOW}$ and the down-range command $R_{DOWN}$ by the on-high oil-temperature down-range permitting means 92. That is, if the down-range command $R_{DOWN}$ is detected, the selected-range uppermost gear position $G_{SELECT}$ takes a value ($G_{SELECT}=G_{NOW}$-the number of detecting $R_{DOWN}$) in which the down-range is initiated from the real gear position $G_{NOW}$ by the number of detection of the down-range command $R_{DOWN}$.

Then, the on-high oil-temperature down-range permitting means 92 executes the operation based on a comparison between the determining gear position $G_{JUGE}$ and the selected-range uppermost gear position $G_{SELECT}$ to determine whether to permit the down-range. That is, if the determining gear position $G_{JUGE}$ becomes greater i.e., larger than the selected-range uppermost gear position $G_{SELECT}$ ($G_{JUGE}>G_{SELECT}$), then no down rage is permitted. In contrast, if the determining gear position $G_{JUGE}$ is less than the selected-range uppermost gear position $G_{SELECT}$ ($G_{JUGE}<G_{SELECT}$), then the down rage is permitted.

Figure 10:
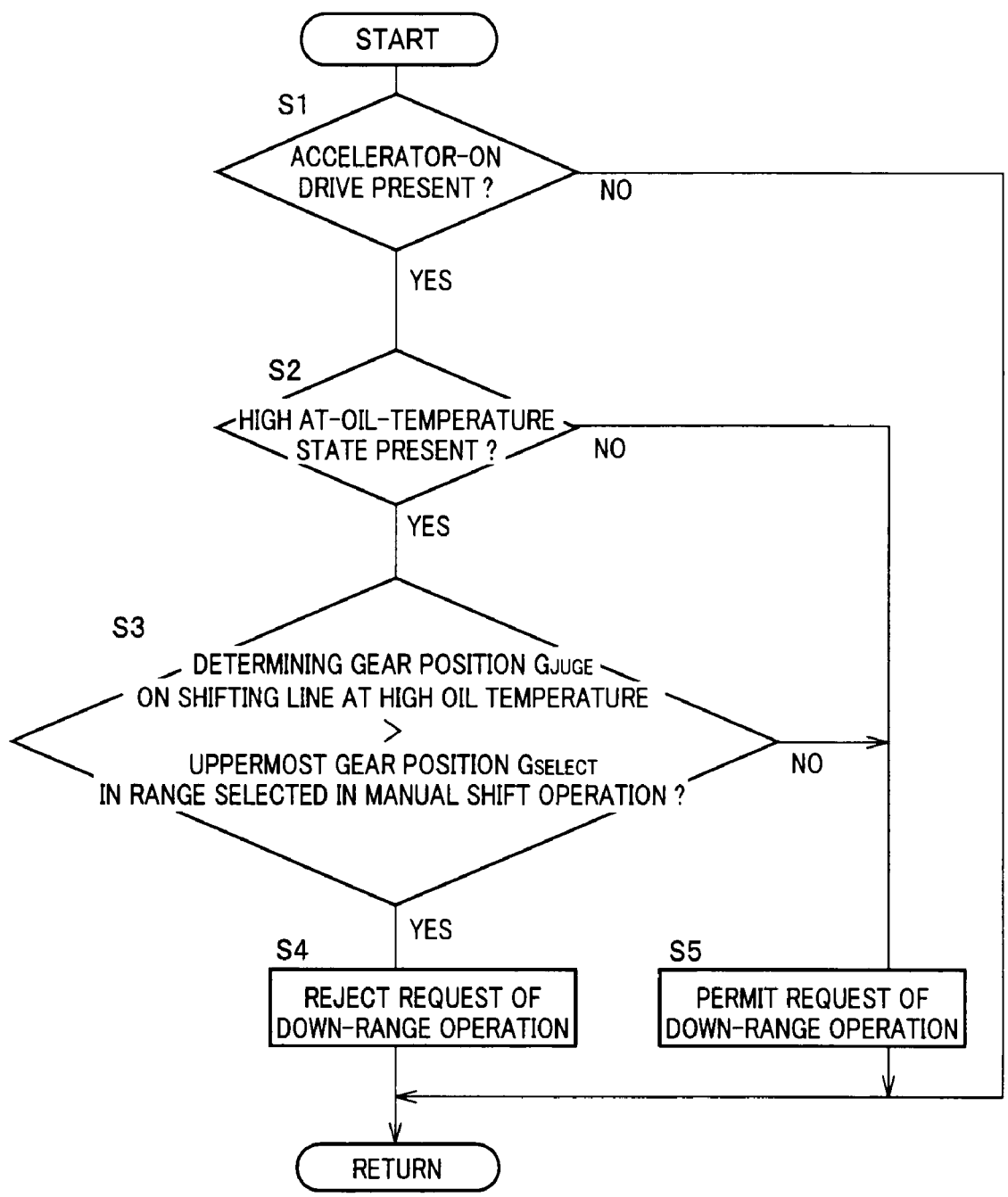
FIG. 10 is a flow chart illustrating a major part of control operations to be executed with the control device by signal processing in the electronic control device functioning as the control device of the automatic transmission.

FIG. 10 is a flow chart illustrating a major part of control operations of the control device to be executed upon performing signal processing in the electronic control device 40 functioning as the control device of the automatic transmission 10. That is, this flow chart represents a series of procedure of determining whether to accept a down-range operation at a high oil temperature during the manual shift mode. This sequence is repeatedly executed for each predetermined cycle in the order of approximately, for instance, several milliseconds to several tens milliseconds.

In FIG. 10, first at step S1 (hereinafter the term "step" will be omitted) corresponding to the accelerator-on drive determining means 86 determines or judges as to whether an actual accelerator-opening Acc exceeds a predetermined accelerator-on drive determining value Acc1. That is, a determination is made if a vehicle running state belongs to an accelerator-on drive.

If the determination in S1 is no, then the current routine is terminated. If the answer is yes, then at S2 corresponding to the high oil-temperature determining means 84, a determination is made as to whether the working oil temperature $T_{OIL}$ in the automatic transmission 10 exceeds a predetermined oil-temperature determining value $T_{OIL}1$. That is, a determination is made if the automatic transmission 10 lies at a high oil-temperature state.

If the determination in S2 is yes, then at S3 corresponding to the on-high oil-temperature down-range permitting means 92, a determination is made as to whether the determining gear position $G_{JUGE}$ is greater than the selected-range uppermost gear position $G_{SELECT}$.

If the determination in S3 is yes, then at S4 corresponding to the on-high oil-temperature down-range permitting means 92, the request of the down-range operation is rejected and the current routine is terminated.

If the determination in S2 is no or if the determination in S3 is no, then at S5 corresponding to the on-high oil-temperature down-range permitting means 92, the request of the down-range operation is permitted and the current routine is terminated.

As set forth above, the control device of the automatic transmission 10 includes high oil-temperature determining means 84, accelerator-on drive determining means 86, on-high oil-temperature automatic up-range control means 90, and on-high oil-temperature down-range permitting means 92. The high oil-temperature determining means 84 is operative to determine presence of the high oil-temperature state with the working oil temperature $T_{OIL}$ in the automatic transmission 10 exceeding the predetermined oil-temperature determining value $T_{OIL}1$. The accelerator-on drive determining means 86 is operative to determine presence of the accelerator-on drive with the accelerator pedal 60 of the vehicle remaining depressed. The on-high oil-temperature automatic up-range control means 90 is operative to switch the shift range of the automatic transmission 10 to the "D" range (maximum shift-width range), when the high oil-temperature determining means 84 determines presence of the high oil-temperature state. The on-high oil-temperature down-range permitting means 92 is operative to permit the initiation of the down-range by the manual shift operation, when the on-high oil-temperature automatic up-range control means 90 switches the shift range of the automatic transmission 10 to the "D" range, and the accelerator-on drive determining means 86 presence of the accelerator-on drive. The down-range is permitted until the selected-range uppermost gear position $G_{SELECT}$, selected by the manual shift operation during the manual shift mode, reaches the determining gear position $G_{JUGE}$ under a circumstance.

With the vehicle having such an automatic transmission 10 operative to select the manual shift mode of the so-called shift-range hold type, obtaining a drive force is attempted during the course of continuing accelerator-on drive, after the on-high oil-temperature automatic up-range control means 90 switched the shift range of the automatic transmission 10 to the "D" range. During such an attempt, the down-range is permitted in the manual shift operation until the selected-range uppermost gear position $G_{SELECT}$ reaches the determining gear position $G_{JUGE}$, thereby preventing a deteriorated acceleration response compared with that achieved with an automatic shift mode.

Next, another embodiment of the present invention will be described below. In the following description, the same component parts as that in the former embodiment bear the same reference numerals to omit redundant description.

Second Embodiment

The automatic transmission 10 shown in FIGS. 1 to 4 and FIGS. 6 to 9 has the same structure and function as those of the first embodiment, and hence descriptions thereof are herein omitted.

Figure 11:
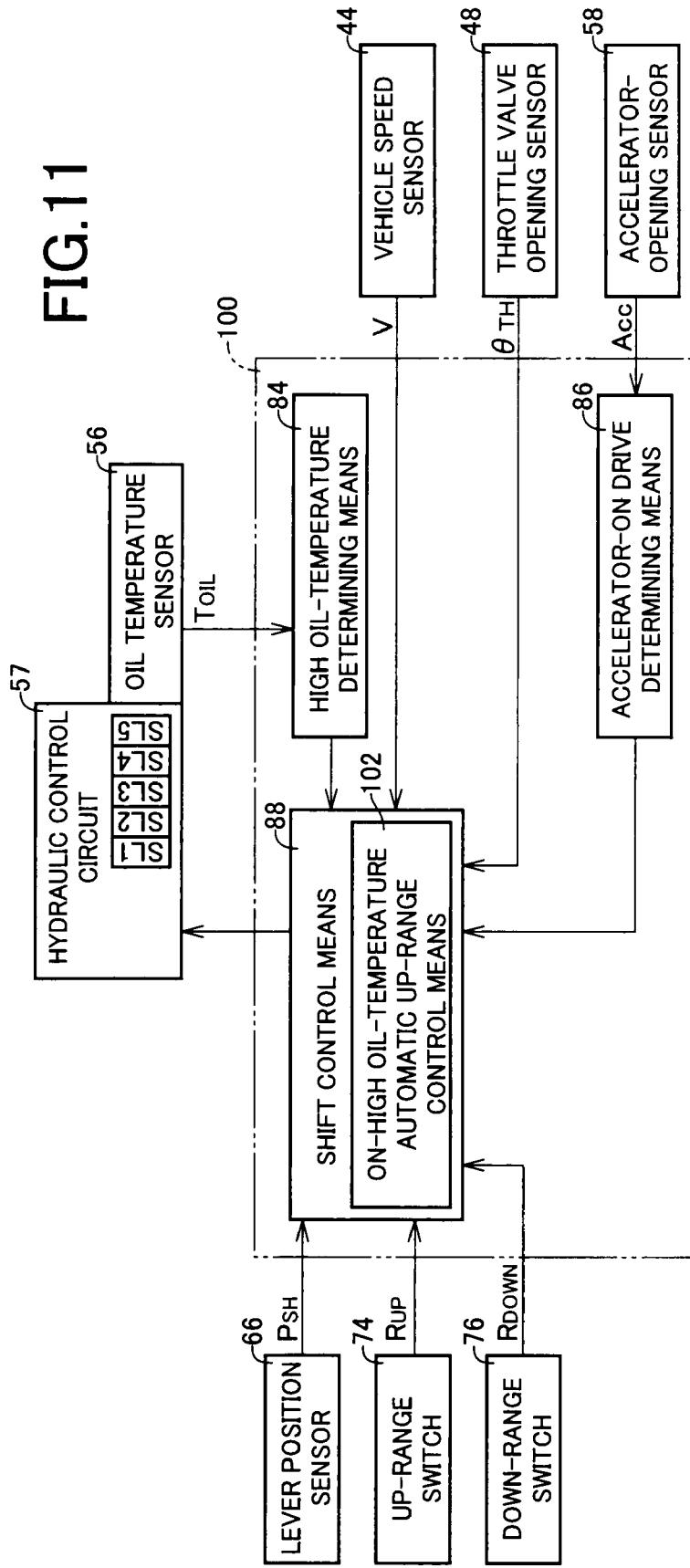
FIG. 11 is a functional block diagram illustrating a major part of a control function of an electronic control device functioning as a control device of an automatic transmission of another embodiment to which the present invention is applied.

FIG. 11 is a functional block diagram illustrating a major part of a control function of an electronic control device 100 functioning as a control device of an automatic transmission 10 of the present embodiment, and corresponds to FIG. 5 related to the first embodiment. The electronic control device 100 shown in FIG. 11 differs from that of the first embodiment shown in FIG. 5 in that no on-high oil-temperature down-range permitting means 92 is provided.

Further, the shift control means 88 includes an on-high oil-temperature automatic up-range control means 102 in replace of the above on-high oil-temperature automatic up-range control means 90. With the manual shift mode being set, the high oil-temperature determining means 84 determines that the working oil temperature $T_{OIL}$ in the automatic transmission 10 lies at the high oil-temperature state, and the accelerator-on drive determining means 86 determines presence of the accelerator-on drive. In this case, the on-high oil-temperature automatic up-range control means 102 switches the shift range of the automatic transmission 10 to a range in which the gear position determined based on the actual vehicle speed V and the throttle valve opening $\theta_{TH}$, i.e., the determining gear position $G_{JUGE}$ is set as the uppermost gear position. The actual vehicle speed V and the throttle valve opening $\theta_{TH}$ are determined by referring to the high oil-temperature shifting diagram in which the plural down-range permitting regions (the "3" range permitting region A3, the "4" range permitting region A4 and the "5" range permitting region A5, etc.), shown in FIG. 8 are preliminarily determined.

In the high oil-temperature shifting diagram shown in FIG. 8, if a position representing the vehicle running state specified with the actual vehicle speed V and the throttle valve opening $\theta_{TH}$ lies at for instance the position "a" in the "3" range permitting region A3, then the determining gear position $G_{JUGE}$ is set to be "3" (3rd-speed gear position "3rd"). If an actual shift range is lower than the "3" range in which the uppermost gear position lies at the 3rd-speed gear position "3rd", then the shift range is up-ranged to the "3" range. In the high oil-temperature shifting diagram shown in FIG. 8, if the position representing the vehicle running state lies at for instance the position "b" in the "4" range permitting region A4, then the determining gear position $G_{JUGE}$ is set to be "4" (4th-speed gear position "4th"). If the actual shift range is lower than the "4" range in which the uppermost gear position lies at the 4th-speed gear position "4th", then the shift range is up-ranged to the "4" range. In the high oil-temperature shifting diagram shown in FIG. 8, if the position representing the vehicle running state lies at for instance the position "c" in the "5" range permitting region A5, then the determining gear position $G_{JUGE}$ is set to be "5" (5th-speed gear position "5th"). If the actual shift range is lower than the "5" range in which the uppermost gear position lies at the 5th-speed gear position "5th", then the shift range is up-ranged to the "5" range.

In the high oil-temperature shifting diagram shown in FIG. 8, if the position representing the vehicle running state lies at for instance the position "d" in the down-range inhibiting region AX, then the determining gear position $G_{JUGE}$ is set to be "6" (6th-speed gear position "6th"). If the actual shift range falls below the "6" range in which the uppermost gear position lies at the 6th-speed gear position "6th", then the shift range is up-ranged to the "6" range. In the present embodiment, further, if the position representing the vehicle running state lies in the low-vehicle speed region A2 at a vehicle speed lower than that of the "3" range permitting region A3 shown in FIG. 8, like the operation conducted in "3" range permitting region A3, the shift range is up-ranged to the "3" range when an actual shift range is less than the "3" range. However, the present invention is construed not to be limited to such an up-range. In a case where the actual shift range falls below the "2" range, a "2" range permitting region may be up-ranged to set the shift range to the "2" range. In addition, the range switching of the on-high oil-temperature automatic up-range control means 102 is executed in priority to the down-range or the up-range initiated in the manual shift operation of the shift operation device 70.

Hereunder, control operations of the on-high oil-temperature automatic up-range control means 102 will be described below in detail. First, the on-high oil-temperature automatic up-range control means 102 determines if the position representing the vehicle running state, specified with the actual vehicle speed V and the throttle valve opening $\theta_{TH}$, belongs to either the "3" range permitting region A3 (low vehicle speed range A2), the "4" range permitting region A4, the "5" range permitting region A5 or the down-range inhibiting region AX. Then, based on such determination, the determining gear position $G_{JUGE}$ is set to "3", "4", "5" or "6".

Subsequently, the on-high oil-temperature automatic up-range control means 102 sets the uppermost gear position of the actual shift range to a real range uppermost gear position $G_{NOWMAX}$.

Next, the on-high oil-temperature automatic up-range control means 102 determines, based on a comparison between the determining gear position $G_{JUGE}$ and the real range uppermost gear position $G_{NOWMAX}$, whether to initiate the up-range. That is, if the determining gear position $G_{JUGE}$ is greater than the real range uppermost gear position $G_{NOWMAX}$ ($G_{JUGE}>G_{NOWMAX}$), then the shift range is set to a range in the up-range to cause the determining gear position $G_{JUGE}$ to be set to the uppermost gear position. In contrast, if the determining gear position $G_{JUGE}$ is lower than the real range uppermost gear position $G_{NOWMAX}$ ($G_{JUGE}<G_{NOWMAX}$), then the current shift range is sustained.

Figure 12:
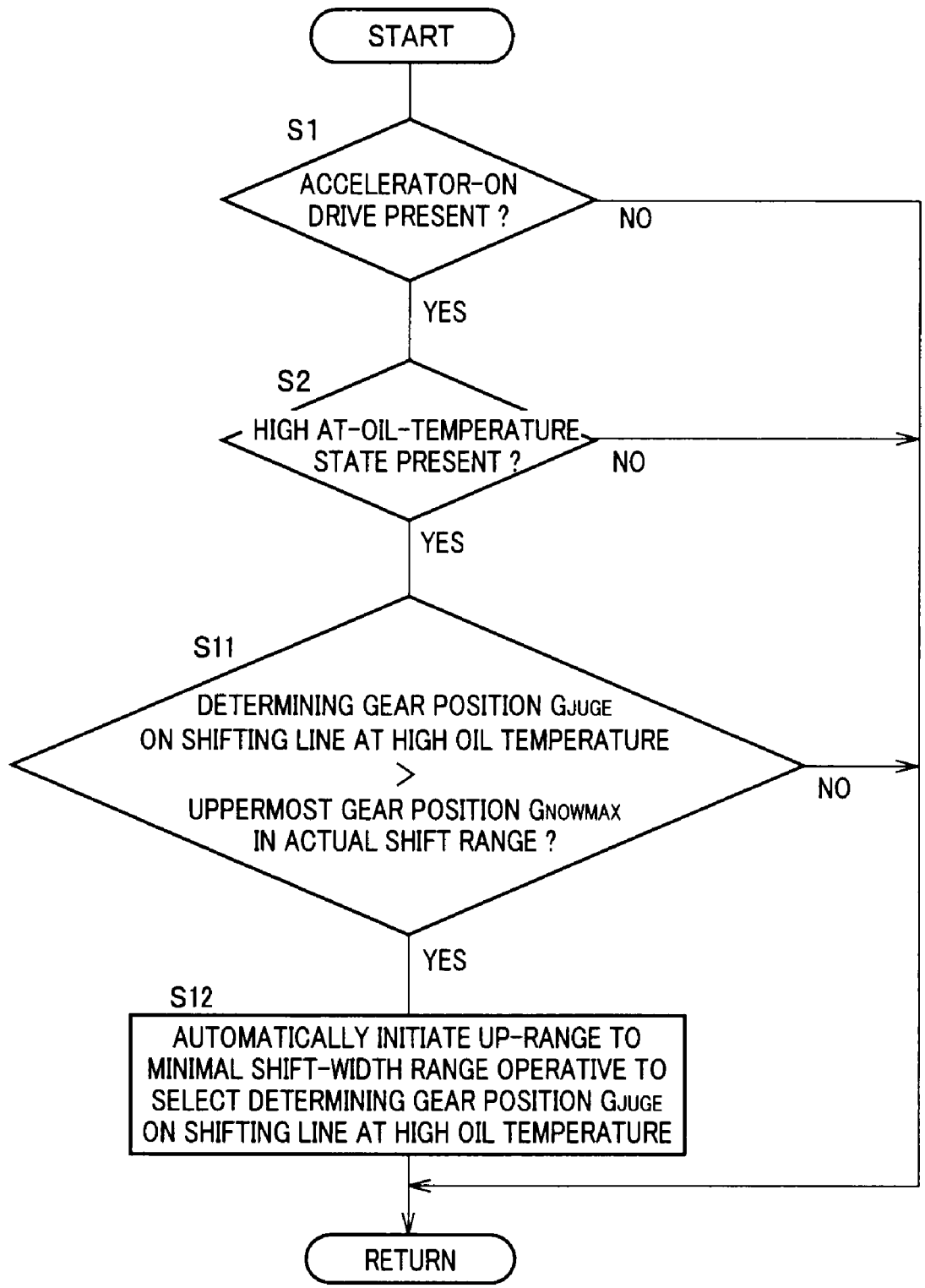
FIG. 12 is a flow chart illustrating a major part of control operations to be executed with the control device by signal processing in the electronic control device, shown in FIG. 11 which functions as the control device of the automatic transmission.

FIG. 12 is a flow chart illustrating a major part of control operations of the control device to be executed in signal processing by the electronic control device 100 which functions as the control device of the automatic transmission 10. That is, this flow chart represents a series of operations of an automatic up-range control to be executed for a high oil-temperature state during a manual shift mode to be repeatedly executed for each predetermined cycle in the order of, for instance, several milliseconds to several tens milliseconds. In addition, S1 and S2 shown in FIG. 12 have the same operations as S1 and S2 shown in FIG. 10, and hence description of the same is herein omitted.

In FIG. 12, if the determination in S2 is no, then, the current routine is terminated. If the determination in S2 is yes, then, at S11 corresponding to the on-high oil-temperature automatic up-range control means 102, a determination is made as to whether the determining gear position $G_{JUGE}$ is greater than the real range uppermost gear position $G_{NOWMAX}$.

If the determination in S11 is no, then, the current routine is terminated. If the determination in S11 is yes, then at S12 corresponding to the on-high oil-temperature automatic up-range control means 102, the shift range is switched to a range with the determining gear position $G_{JUGE}$ being set as the uppermost gear position, followed by termination of the current routine.

As set forth above, the control device of the automatic transmission 10 of the present embodiment includes high oil-temperature determining means 84, accelerator-on drive determining means 86, and on-high oil-temperature automatic up-range control means 102. The high oil-temperature determining means 84 is operative to determine presence of the high oil-temperature state with the working oil temperature $T_{OIL}$ in the automatic transmission 10 exceeding the predetermined oil-temperature determining value $T_{OIL}1$. The accelerator-on drive determining means 86 is operative to determine presence of the accelerator-on drive with the accelerator pedal 60 of the vehicle remaining depressed. The on-high oil-temperature automatic up-range control means 102 is operative to switch the shift range of the automatic transmission 10 to the range in which the determining gear position $G_{JUGE}$ is set in the uppermost gear position, when the accelerator-on drive determining means 86 determines presence of the accelerator-on drive. Such a determination is made based on the actual vehicle speed V and the throttle valve opening $\theta_{TH}$, by referring to a predetermined high oil-temperature shifting diagram in which shift lines are preset to lie at a lower vehicle speed than those of a basic shifting diagram used for a shift determination made in the absence of the high oil-temperature state during the automatic shift mode.

In a vehicle having the automatic transmission 10 of a multi-stage including forward-drive 6-stages available to select a manual shift mode of a so-called shift-range hold type, the manual shift operation of the shift operation device 70 is prevented from being complicated in operation during the manual shift mode. That is, when the high oil-temperature state appears during the vehicle running under the accelerator-on drive, no shift range is uniformly switched to the "D" range (with the maximum shift-width range). Thus, when obtaining an engine braking is attempted after execution of the on-high oil-temperature automatic up-range control means 102, the engine braking can be obtained at an adequate rate by releasing the accelerator pedal 60 or by initiating the down-range about once after releasing the accelerator pedal 60. Accordingly, even when obtaining the engine braking is attempted after execution of the on-high oil-temperature automatic up-range control means 102, no need arises to repeatedly perform the down-range operation.

Third Embodiment

The automatic transmission 10 shown in FIGS. 1, 2 and 4 and FIGS. 6 to 9 has the same structure and function as those of the first embodiment, and hence, description of the same is herein omitted.

The structure shown in FIG. 3 is common to that of the first embodiment except for differing points described below. That is, an electronic control device 110 functioning as a control device of the automatic transmission 10 of the present embodiment is supplied with various signals. These signals include a signal representing an upshift command $SH_{UP}$ and a signal representing a downshift command $SH_{DOWN}$. The signal representing an upshift command $SH_{UP}$ is used instead of the signals representing the up-range command $R_{UP}$ and the down-range command $R_{DOWN}$ used in the first embodiment. The signal representing an upshift command $SH_{UP}$ is used to upshift the gear position in response to the manual shift operation of the shift operation device 70, i.e., for each operation of the shift lever 72 to be set to the upshift position "+" detected by the upshift switch 112. The signal representing a downshift command $SH_{DOWN}$ is used to shift down the gear position in response to the manual shift operation of the shift operation device 70, i.e., for each operation of the shift lever 72 to be set to the downshift position "-" detected by the downshift switch 114.

Figure 13:
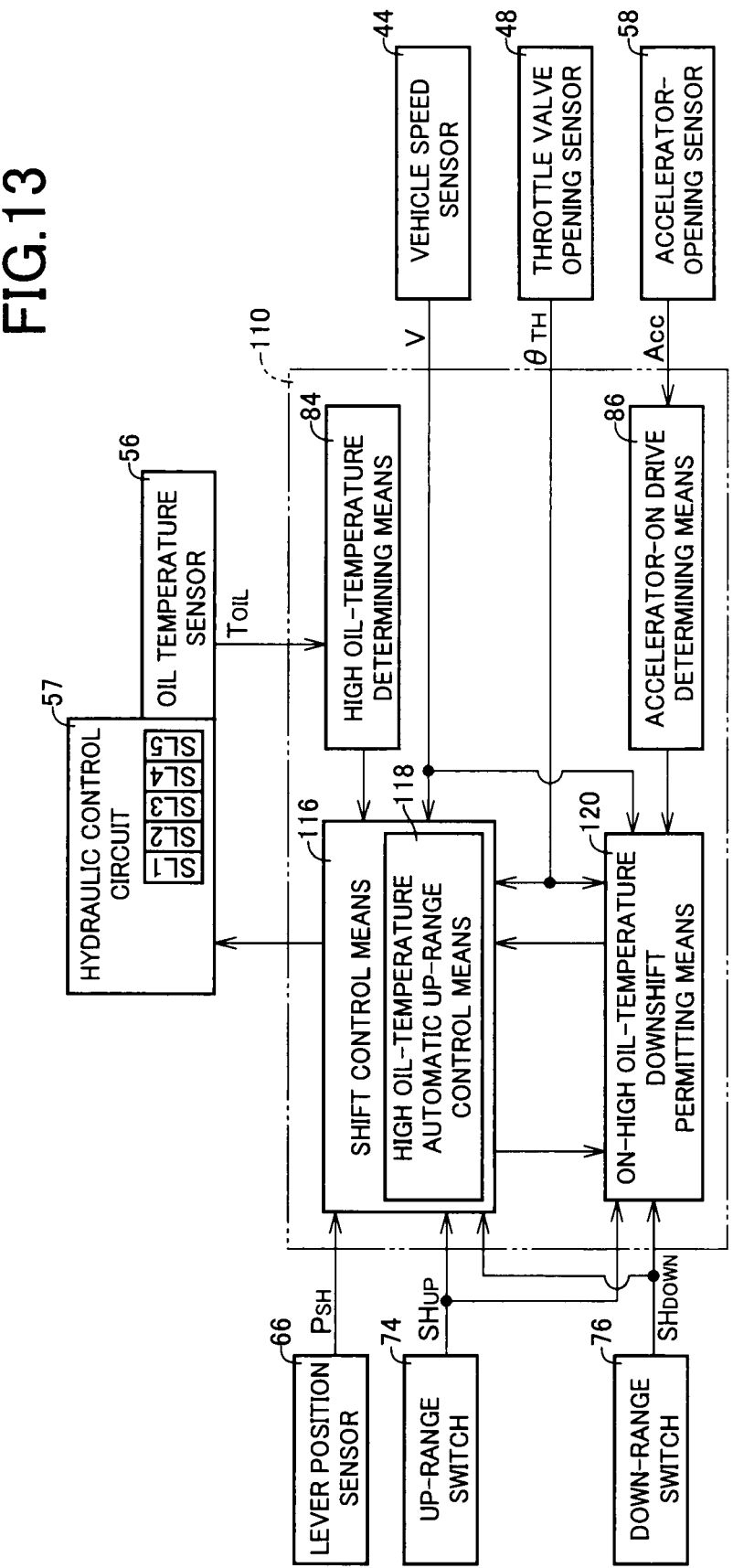
FIG. 13 is a functional block diagram illustrating a major part of a control function of an electronic control device functioning as a control device of an automatic transmission of another embodiment to which the present invention is applied.

FIG. 13 is a functional block diagram illustrating a major part of a control function of the electronic control device 110 and corresponding to FIG. 5. Shift control means 116 of the present embodiment shown in FIG. 13 is similar to the shift control means 88 shown in FIG. 8, except for differing points described below. That is, with the manual shift mode being set, the shift control means 116 switches the gear position of the automatic transmission 10 from the 1st-speed gear position "1st" to the 6th-speed gear position "6th" one by one for each manual shift operation. That is, in the illustrated embodiment, the manual shift mode is of a so-called gear-position hold type in which the gear position of the automatic transmission 10 is caused to upshift or downshift for each manual shift operation.

Further, the shift control means 116 includes high oil-temperature automatic up-range control means 118 in replace of the on-high oil-temperature automatic up-range control means 90 shown in FIG. 5. With the manual shift mode being set, the high oil-temperature determining means 84 determines that the working oil temperature $T_{OIL}$ in the automatic transmission 10 lies at the high oil-temperature state. In such a case, the high oil-temperature automatic up-range control means 118 switches the shift range of the automatic transmission 10 to the uppermost gear position, i.e., the 6th-speed gear position "6th". The high oil-temperature automatic up-range control means 118 executes the operation to switch the shift position to the uppermost gear position in priority to the downshift or the upshift initiated in the manual shift operation. In addition, as long as the high oil-temperature determining means 84 determines presence of the high oil-temperature state, the high oil-temperature automatic up-range control means 118 does not accept the manual shift operation, unless a predetermined condition is satisfied. As used herein, the term "given condition" refers to a state in which the vehicle is running with the accelerator pedal being released, i.e., the accelerator-opening Acc being 0 [%], and the vehicle speed V lies at the predetermined downshift permit vehicle speed V1 or less or another state in which an on-high oil-temperature downshift permitting means 120 permits the initiation of the downshift.

In FIG. 13, further, the electronic control device 110 includes the on-high oil-temperature downshift permitting means 120 in replace of the on-high oil-temperature automatic down-range permitting means 92. A on-high oil-temperature automatic upshift control means 118 determines switching of the gear position of the automatic transmission 10 to the "6th-speed gear position "6th", and the accelerator-on drive determining means 86 determines presence of the accelerator-on drive. In such a case, the on-high oil-temperature downshift permitting means 120 accepts the manual shift operation to permit the initiation of the downshift. That is, the downshift is permitted until the gear position, i.e., the selected gear position $G_{SELECT}$ selected in the manual shift operation during the manual shift mode reaches a gear position, i.e., the determining gear position $G_{JUGE}$. The determining gear position $G_{JUGE}$ is determined based on the actual vehicle speed V and the throttle valve opening $\theta_{TH}$ by referring to a predetermined high oil-temperature shifting diagram set for each of downshift permitting regions (3rd-speed gear position permitting region A3, 4th-speed gear position permitting region A4 and 5th-speed gear position permitting region A5, etc.), as shown in FIG. 8.

In the high oil-temperature shifting diagram shown in FIG. 8, further, if a position representing the vehicle running state specified with the actual vehicle speed V and the throttle valve opening $\theta_{TH}$ lies in the downshift inhibiting region AX, then the determining gear position $G_{JUGE}$ is set to be "6" (6th-speed gear position "6th"). In this moment, no downshift is permitted and the 6th-speed gear position "6th" is sustained. In the present embodiment, further, if the position representing the vehicle running state lies in the low vehicle speed region A2 at a vehicle speed lower than that of the 3rd-speed permitting region A3 shown in FIG. 8, like the operation conducted in the 3rd-speed permitting region A3, the downshift is permitted down to the 3rd-speed gear position "3rd". However, the present invention is construed not to be limited to such a downshift range and a 2nd-speed gear position permitting region, in which a downshift is permitted down to the 2nd-speed gear position "2nd", or a 1st-speed gear position permitting region, in which a downshift is permitted to a 1st-speed gear position "1st", may be set.

Hereunder, control operations to be executed by the on-high oil-temperature downshift permitting means 120 will be described below in detail. First, the on-high oil-temperature downshift permitting means 120 determines if the position representing the vehicle running state, specified with the actual vehicle speed V and the throttle valve opening $\theta_{TH}$ belongs to either the 3rd-speed gear position permitting region A3 (low vehicle speed region A2), the 4th-speed gear position permitting region A4, the 5th-speed gear position permitting region A5 or the downshift inhibiting region AX. Based on such determination, the determining gear position $G_{JUGE}$ is set to the "3", "4", "5" or "6".

Next, the on-high oil-temperature downshift permitting means 120 calculates the real gear position $G_{NOW}$ based on actual engine revolutions $N_E$ and the vehicle speed V by referring to the real gear-position calculating map shown in FIG. 9.

Subsequently, the on-high oil-temperature downshift permitting means 120 determines the selected gear position $G_{SELECT}$ based on the real gear position $G_{NOW}$ and the downshift command $SH_{DOWN}$. That is, when the downshift command $SH_{DOWN}$ is detected, the selected gear position $G_{SELECT}$ is set to a value ($G_{SELECT}=G_{NOW}$–numbers of detection of $SH_{DOWN}$) representing that the shift range is reduced from the real gear position $G_{NOW}$ by the number of detection of the downshift command $SH_{DOWN}$.

Consecutively, the on-high oil-temperature downshift permitting means 120 determines based on a comparison between the determining gear position $G_{JUGE}$ and the selected gear position $G_{SELECT}$ whether to permit the downshift. That is, if the determining gear position $G_{JUGE}$ is greater than the selected gear position $G_{SELECT}$ ($G_{JUGE}>G_{SELECT}$), then no downshift is permitted. In contrast, if the determining gear position $G_{JUGE}$ is lower than the selected gear position $G_{SELECT}$ ($G_{JUGE}<G_{SELECT}$), then, the downshift is permitted.

Figure 14:
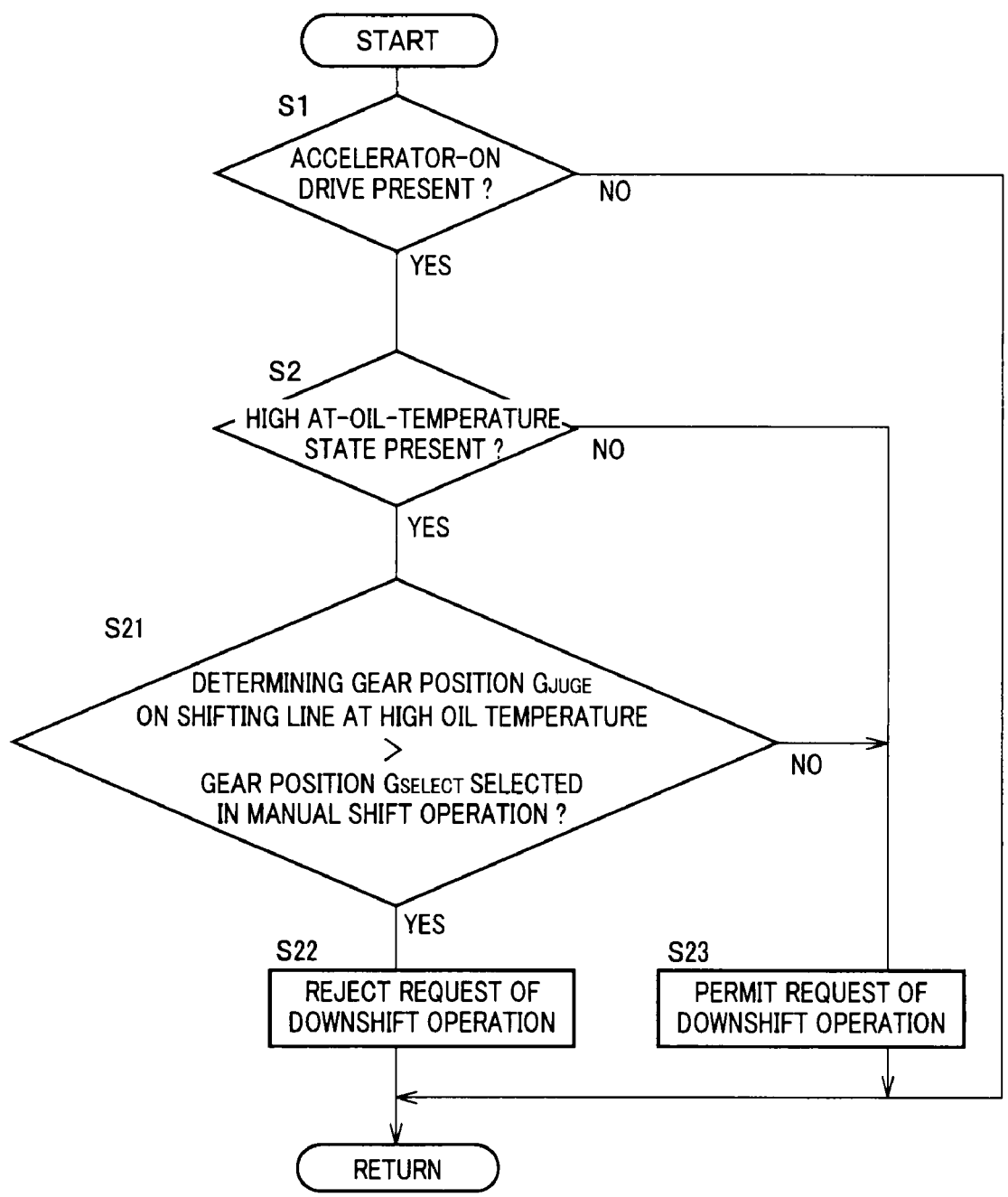
FIG. 14 is a flow chart illustrating a major part of control operations to be executed with the control device by signal processing in the electronic control device, shown in FIG. 13, which functions as the control device of the automatic transmission.

FIG. 14 is a flow chart illustrating a major part of control operations of the control device to be executed in signal processing by the electronic control device 110 which functions as the control device of the automatic transmission 10. That is, this flow chart represents a series of operations for determining whether to permit or reject a downshift operation for the high oil-temperature state during the manual shift mode. It is repeatedly executed for each given cycle in the order of, for instance, several milliseconds to several tens milliseconds. In addition, S1 and S2 shown in FIG. 14 have the same operations as S1 and S2 shown in FIG. 10, and hence, description of the same is herein omitted.

In FIG. 14, if the determination in S2 is no, then the current routine is terminated. If the determination in S2 is yes, then, at S21 corresponding to the on-high oil-temperature downshift permitting means 120, a determination is made as to whether the determining gear position $G_{JUGE}$ is greater than the selected gear position $G_{SELECT}$.

If the determination in S21 is yes, then at S22 corresponding to the on-high oil-temperature downshift permitting means 120, the request of the downshift operation is rejected, followed by termination of the current routine.

If the determination in S21 is no, then at S23 corresponding to the on-high oil-temperature downshift permitting means 120, the request of the downshift operation is permitted, followed by termination of the current routine.

As set forth above, the control device of the automatic transmission 10 of the present embodiment includes high oil-temperature determining means 84, accelerator-on drive determining means 86, high oil-temperature automatic up-range control means 118, and on-high oil-temperature downshift permitting means 120. The high oil-temperature determining means 84 is operative to determine presence of the high oil-temperature state with the working oil temperature $T_{OIL}$ in the automatic transmission 10 exceeding the predetermined oil-temperature determining value $T_{OIL}1$. The accelerator-on drive determining means 86 is operative to determine presence of the accelerator-on drive with the accelerator pedal 60 of the vehicle remaining depressed. The high oil-temperature automatic up-range control means 118 is operative to switch the shift range of the automatic transmission 10 to the 6th-speed gear position "6th" (highest speed gear position), when the high oil-temperature determining means 84 determines presence of the high oil-temperature state. The on-high oil-temperature downshift permitting means 120 is operative to permit the downshift in the manual shift operation, when the high oil-temperature automatic up-range control means 118 switches the shift range of the automatic transmission 10 to the 6th-speed gear position "6th", and the accelerator-on drive determining means 86 determines presence of the accelerator-on drive, until the selected gear position $G_{SELECT}$ selected in the manual shift operation during the manual shift mode reaches the determining gear position $G_{JUGE}$.

In the vehicle having the automatic transmission 10 available to select the manual shift mode of a so-called gear-position hold type, obtaining a drive force is attempted during the vehicle running under the accelerator-on drive, after the high oil-temperature automatic up-range control means 118 switches the gear position to the 6th-speed gear position "6th". Even in such an attempt, the downshift is permitted in the manual shift operation until the selected gear position $G_{SELECT}$ reaches the determining gear position $G_{JUGE}$. This results in a prevention of deteriorated acceleration response in contrast to that achieved with the automatic shift mode.

Fourth Embodiment

The automatic transmission 10 shown in FIGS. 1 to 4 and FIGS. 6 to 9 has the same structure and function as those of the third embodiment described above, and hence, description of the same is herein omitted.

Figure 15:
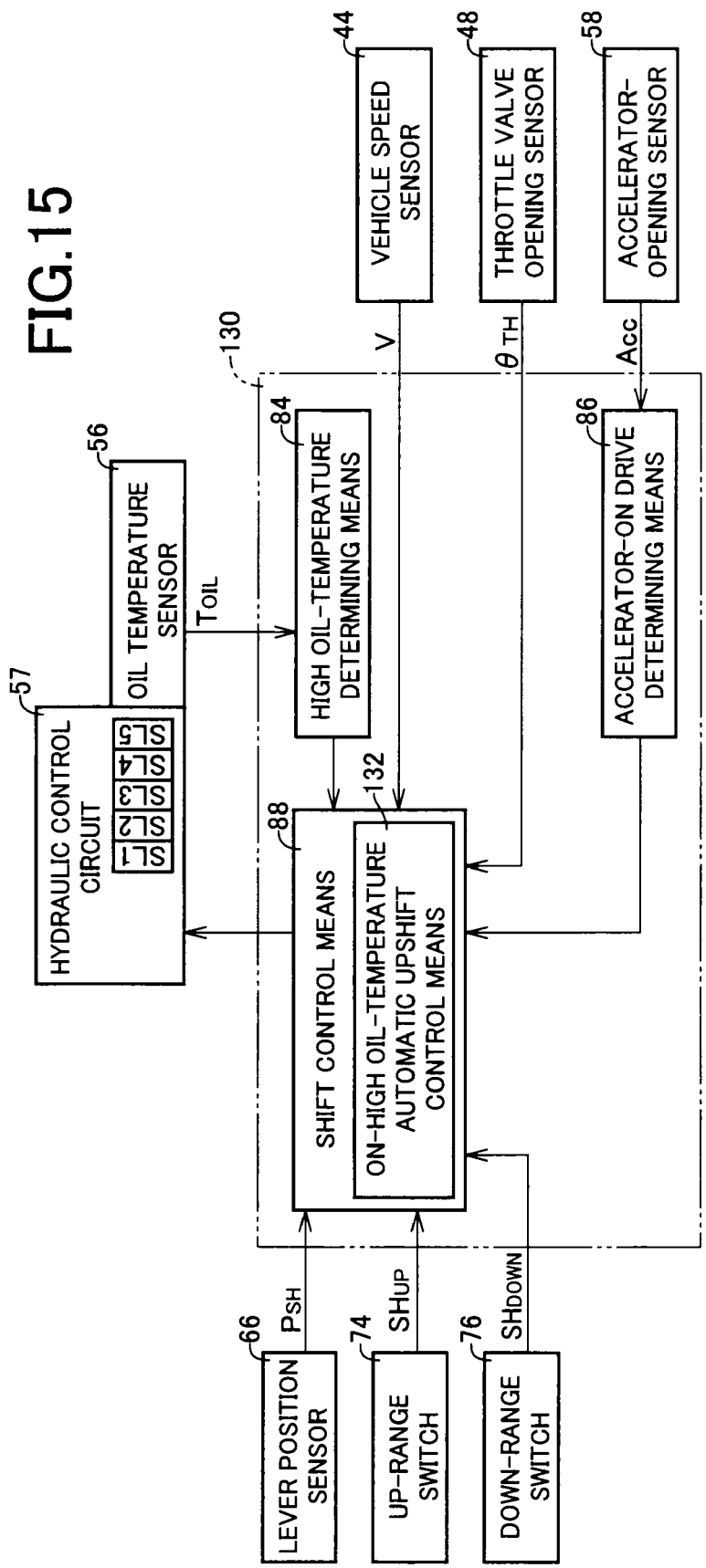
FIG. 15 is a functional block diagram illustrating a major part of a control function of an electronic control device functioning as a control device of an automatic transmission of another embodiment to which the present invention is applied.

FIG. 15 is a functional block diagram, illustrating a major part of a control function of an electronic control device 130 that functions as the control device of the automatic transmission 10 of the present embodiment, which corresponds to FIG. 13 related to the third embodiment. In FIG. 15, the electronic control device 130 differs from the structure shown in FIG. 13 related to the third embodiment, and no on-high oil-temperature downshift permitting means 120 is provided.

Further, the shift control means 88 includes an on-high oil-temperature automatic upshift control means 132 in replace of the on-high oil-temperature automatic up-range control means 102 shown in FIG. 11. With the manual shift mode being set, the high oil-temperature determining means 84 determines that the working oil temperature $T_{OIL}$ in the automatic transmission 10 lies at the high oil-temperature state, and the accelerator-on drive determining means 86 determines presence of the accelerator-on drive. In this case, the on-high oil-temperature automatic upshift control means 132 switches the gear position of the automatic transmission 10 to a gear position i.e., the determining gear position $G_{JUGE}$, determined based on the actual vehicle speed V and the throttle valve opening $\theta_{TH}$, by referring to the high oil-temperature shifting diagram shown in FIG. 8. In the high oil-temperature shifting diagram, the plural down-range permitting regions (the "3" range permitting region A3, the "4" range permitting region A4 and the "5" range permitting region A5, etc.), are preliminarily determined.

In the high oil-temperature shifting diagram shown in FIG. 8, if a position representing the vehicle running state specified with the actual vehicle speed V and the throttle valve opening $\theta_{TH}$ lies at for instance the position "a" in the 3rd-speed gear position permitting region A3, then the determining gear position $G_{JUGE}$ is set to be "3" (3rd-speed gear position "3rd"). If the real i.e., actual gear position $G_{NOW}$ falls below the 3rd-speed gear position "3rd", then the upshift is initiated to place the gear position to the 3rd-speed gear position "3rd". In the high oil-temperature shifting diagram shown in FIG. 8, if the position representing the vehicle running state lies at for instance the position "b" in the 4th-speed gear position permitting region A4, then the determining gear position $G_{JUGE}$ is set to be "4" (4th-speed gear position "4th"). If the real gear position $G_{NOW}$ falls below the 4th-speed gear position "4th", then the upshift is initiated to place the gear position to the 4th-speed gear position "4th". In the high oil-temperature shifting diagram shown in FIG. 8, if the position representing the vehicle running state lies at for instance the position "c" in the 5th-speed gear position permitting region A5, then the determining gear position $G_{JUGE}$ is set to be "5" (5th-speed gear position "5th"). If the real gear position $G_{NOW}$ falls below the 5th-speed gear position "5th", then the upshift is initiated to place the gear position to the 5th-speed gear position "5th".

In the high oil-temperature shifting diagram shown in FIG. 8, if the position representing the vehicle running state lies at for instance the position "d" in the down-range inhibiting region AX, then, the determining gear position $G_{JUGE}$ is set to be "6" (6th-speed gear position "6th"). If the real gear position $G_{NOW}$ falls below the 6th-speed gear position "6th", then the upshift is initiated to place the gear position to the 6th-speed gear position "6th". In the present embodiment, further, if the position representing the vehicle running state lies in the low vehicle speed region A2 at a vehicle speed lower than that of the 3rd-speed gear position permitting region A3 shown in FIG. 8, like the operation conducted in the 3rd-speed gear position permitting region A3, the upshift is initiated to place the gear position up to the 3rd-speed gear position "3rd". However, the present invention is construed not to be limited to such a gear position, and a 2nd-speed gear position permitting region may be set in which the upshift is initiated up to the 2nd-speed gear position "2nd" when the real gear position $G_{NOW}$ falls below the 2nd-speed gear position "2nd". Moreover, the on-high oil-temperature automatic upshift control means 132 switches the gear position in priority to the manual shift operation of the sift operation device 70 executed for the downshift or the upshift.

Hereunder, control operations to be executed by the on-high oil-temperature automatic upshift control means 132 will be described below in detail. First, the on-high oil-temperature automatic upshift control means 132 determines if the position representing the vehicle running state specified with the actual vehicle speed V and the throttle valve opening $\theta_{TH}$ belongs to either the 3rd-speed gear position permitting region A3 (the low vehicle speed range A2), the 4th-speed gear position permitting region A4, the 5th-speed gear position permitting region A5 or the down-range inhibiting region AX. Based on such determination, the determining gear position $G_{JUGE}$ is set to the "3", "4", "5" or "6".

Subsequently, the on-high oil-temperature automatic upshift control means 132 calculates the real gear position $G_{NOW}$ based on the actual engine revolutions $N_E$ and the vehicle speed V by referring to, for instance, the real gear-position calculating map shown in FIG. 9.

Subsequently, the on-high oil-temperature automatic upshift control means 132 determines whether to initiate the upshift based on a comparison between the determining gear position $G_{JUGE}$ and the real gear position $G_{NOW}$. That is, if the determining gear position $G_{JUGE}$ is greater than the real gear position $G_{NOW}$ ($G_{JUGE} > G_{NOW}$), then the upshift is initiated to the determining gear position $G_{JUGE}$. In contrast, if the determining gear position $G_{JUGE}$ is less than the real gear position $G_{NOW}$ ($G_{JUGE} < G_{NOW}$), then the current gear position is sustained.

Figure 16:
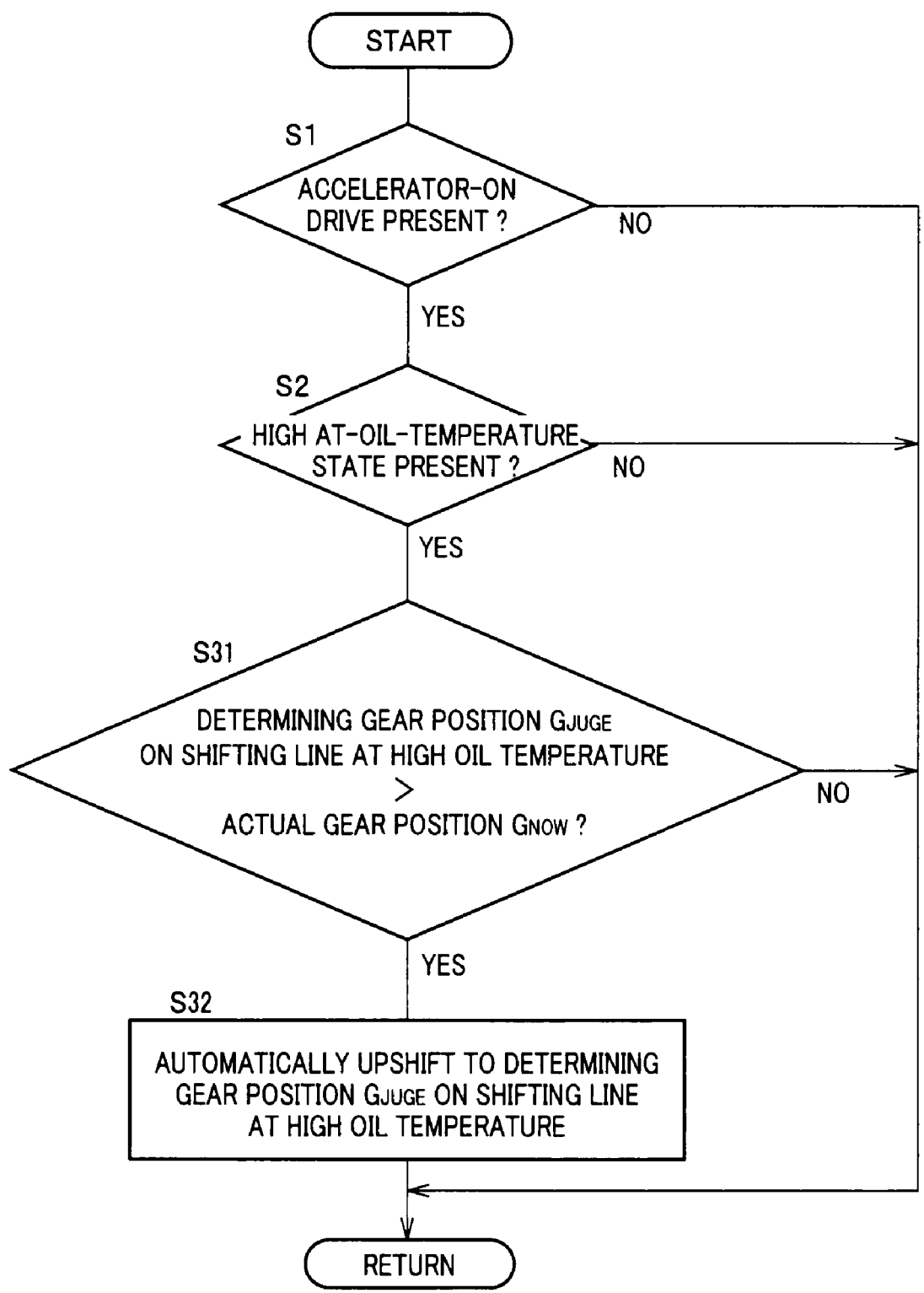
FIG. 16 is a flow chart illustrating a major part of control operations to be executed with the control device by signal processing in the electronic control device, shown in FIG. 15, which functions as the control device of the automatic transmission.
Figure 17:
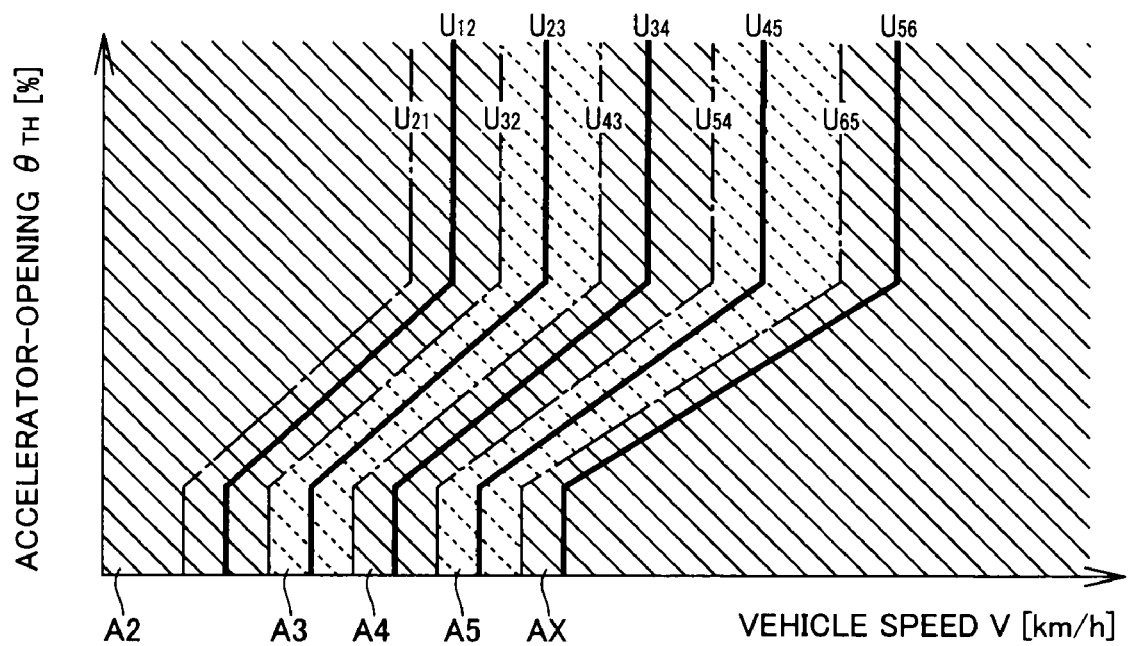
FIG. 17 is a view showing one example of a high oil-temperature shifting diagram in which a plurality of down-range permitting regions are preliminarily determined.

FIG. 16 is a flow chart illustrating a major part of control operations of the control device to be executed in signal processing by the electronic control device 130 which functions as the control device of the automatic transmission 10. That is, this flow chart represents a series of operations executed for performing an automatic upshift control for a high oil-temperature state during the manual shift mode. It is repeatedly executed for each predetermined cycle in the order of, for instance, several milliseconds to several tens milliseconds. In addition, S1 and S2 shown in FIG. 16, have the same operations as S1 and S2 shown in FIG. 14, and hence, description of the same is herein omitted.

In FIG. 16, if the determination in S2 is no, then the current routine is terminated. If the determination in S2 is yes, then, at S31 corresponding to the on-high oil-temperature automatic upshift control means 132, a determination is made as to whether the determining gear position $G_{JUGE}$ is greater than the real gear position $G_{NOW}$.

If the determination in S31 is no, then the current routine is terminated. If the determination in S31 is yes, then at S32 corresponding to the on-high oil-temperature automatic upshift control means 132, the gear position is switched to the determining gear position $G_{JUGE}$ and the current routine is terminated.

As set forth above, the control device of the automatic transmission 10 of the present embodiment includes high oil-temperature determining means 84, accelerator-on drive determining means 86 and on-high oil-temperature automatic upshift control means 132. The high oil-temperature determining means 84 is operative to determine presence of the high oil-temperature state with the working oil temperature $T_{OIL}$ in the automatic transmission 10 exceeding the predetermined oil-temperature determining value $T_{OIL}$. The accelerator-on drive determining means 86 is operative to determine presence of the accelerator-on drive with the accelerator pedal 60 of the vehicle remaining depressed. The on-high oil-temperature automatic upshift control means 132 is operative to switch the shift range of the automatic transmission 10 to the determining gear position $G_{JUGE}$ determined based on the vehicle condition, by referring to the predetermined high oil-temperature shifting diagram. In the high oil-temperature shifting diagram, the shifting lines are set to a lower vehicle speed lower than those of the shifting diagram used for the shift determination in the absence of the high oil-temperature state during the automatic shift mode, when the high oil-temperature determining means 84 determines presence of the high oil-temperature state, and the accelerator-on drive determining means 86 determines presence of the accelerator-on drive.

In the vehicle having the automatic transmission 10 available to select the manual shift mode of a so-called gear-position hold type, the manual shift operation of the shift operation device 70 is prevented from being complicated in operation during the manual shift mode. That is, if the high oil-temperature state is present during the accelerator-on drive, no gear position is uniformly switched to the 6th-speed gear position "6th". Thus, when attempting to obtain engine braking after execution of the on-high oil-temperature automatic upshift control means 132, releasing the accelerator pedal 60 or initiating the downshift about once upon releasing the accelerator pedal 60 renders the obtaining adequate engine braking. That is, even when attempting to have engine braking after execution of the on-high oil-temperature automatic upshift control means 132, no need arises to repeatedly perform the downshift.

In the foregoing, while the embodiments of the present invention have been described above with reference to the accompanying drawings, the present invention is construed not to be limited to such embodiments and may be implemented in various other modes.

In the illustrated embodiments noted above, the high oil-temperature shifting diagram shown in FIG. 8 is plotted to have the predetermined down-range permitting regions ("3"

range permitting region A3, "4" range permitting region A4, "5" range permitting region A5 and the low vehicle speed A2) or the down-shift inhibiting region AX, and the respective downshift permitting regions (3rd-speed gear position permitting region A3, 4th-speed gear position permitting region A4, 5th-speed gear position permitting region A5 and the low vehicle speed A2) or the down-shift inhibiting region AX. However, the present invention is construed not to be limited to those shown in FIG. 8. For instance, each of the permitting regions and the inhibiting regions may be set to lie in an area between the respective downshift lines.

Further although the present embodiments are described above with reference to the shift control means 88 arranged to determine the shift based on the vehicle speed and throttle opening $\theta_{TH}$ corresponding to the demanded output correlated value, the present invention is construed not to be limited to such values. That is, the demanded output correlated value may include the accelerator-opening Acc, the fuel injection quantity or the intake air quantity Q, etc.

While the present embodiments have been described with reference to an exemplary case in which the shift operation device 70 includes the shift lever 50, the shift operation device 70 may be realized using other structures such as switch type structures like, for instance, a paddle switch and a push-button switch, etc.

In the illustrated embodiments, further, the present invention has been described with reference to the automatic transmission preferably in the form of a planetary gear type automatic transmission including the plural planetary gear units. However, various automatic transmissions of step-variable stages may be adopted enabling automatic transmissions of parallel-shaft types to be used with plural friction engaging devices and synchronized meshing clutches or the like being selectively engaged or disengaged to provide speed ratios in a plurality of different gear positions. Moreover, the structure of the automatic transmission of the automatic transmission 10 is construed not to be limited to those of the illustrated embodiments set forth above. The present invention is not particularly limited to a structure in respect of whether the number of planetary gear units, the number of gear positions and the number of clutches C and the brakes B are selectively connected to any elements of the planetary gear units.

In the illustrated embodiments, furthermore, the vehicle, to which one embodiment of the present invention is applied, has been described with reference to a structure of the FF type and including the transverse-mounted automatic transmission 10 with the engine 26 mounted as the drive-force source for running the vehicle. The present invention is construed not to limited to such a structure, for instance, it may be applied to a vehicle of FR type or another drive type. Moreover, the present invention may be applied to a hybrid vehicle or the like with, for instance, THS or the like including the engine 26 composed of the internal combustion engine such as a gasoline engine or a diesel engine, etc., and, in addition thereto, an electric motor for driving the drive vehicles.

Further, it is intended that the embodiments described above be considered only as illustrative of the present invention. Although no exemplary illustrations are made on every detail, various modifications and improvements will be apparent to those skilled in the art without departing from the scope of the present invention.

What is claimed is:

1. A control device for a vehicular automatic transmission having a shift control unit operative such that (i) with an automatic shift mode set, a gear position in the automatic transmission is automatically switched within a range of a maximum shift-width based on a vehicle condition by referring to a preliminarily stored shifting diagram, and (ii) with a manual shift mode set, the gear position is switched to plural ranges, one by one for each manual shift operation of a shift operation device, in which low-speed side gear positions lower than an uppermost gear position in the maximum shift-width range is set as the uppermost gear position, the control device comprising:
    A high oil-temperature determining unit that determines whether temperature of a working-oil in the automatic transmission lies in a high oil-temperature state exceeding an oil-temperature determining value preliminary set;
    an accelerator-on drive determining unit that determines whether an accelerator-on drive is present with an accelerator pedal of the vehicle depressed; and
    an on-high oil-temperature down-range permitting unit that permits a down-range by the manual shift operation when the high oil-temperature determining unit determines presence of the high oil-temperature state and therefore the shifting diagram is switched to a high oil-temperature shifting diagram which is preliminarily set in a lower speed side lower than that of the shifting diagram and the accelerator-on drive determining unit determines presence of the accelerator-on drive state, the on-high oil-temperature down-range permitting unit permitting the down-range until the uppermost gear position in the range selected by the manual shift operation during the manual shift mode reaches a gear position determined based on the vehicle condition by referring to the high oil-temperature shifting diagram, and that does not permit a down-range by the manual shift operation when the high oil-temperature determining unit determines that the temperature of the working-oil does not lie in the high oil-temperature state or the accelerator-on drive determining unit determines that the accelerator-on drive is not present after the uppermost gear position reached a gear position determined based on the vehicle condition by referring to the high oil-temperature shifting diagram.

2. A control device for a vehicular automatic transmission having a shift control unit operative such that (i) with an automatic shift mode set, a gear position in the automatic transmission is automatically switched within a range of a maximum shift-width based on a vehicle condition by referring to a preliminarily stored shifting diagram, and (ii) with a manual shift mode set, the gear position is switched to plural ranges, one by one for each manual shift operation of a shift operation device, in which low-speed side gear positions lower than an uppermost gear position in the maximum shift-width range is set as the uppermost gear position, the control device comprising:
    a high oil-temperature determining unit that determines whether temperature of a working-oil in the automatic transmission lies in a high oil-temperature state exceeding an oil-temperature determining value preliminary set;
    an accelerator-on drive determining unit that determines whether an accelerator-on drive is present with an accelerator pedal of the vehicle depressed; and
    an on-high oil-temperature automatic up-range control unit that switches a shift range of the automatic transmission when the high oil-temperature determining unit determines presence of the high oil-temperature state and the accelerator-on drive determining unit determines presence of the accelerator-on drive state, the on-high oil-temperature automatic up-range control unit switching the shift range to a range in which a gear position, determined based on the vehicle condition by referring to a high oil-temperature shifting diagram preliminary set in a lower speed area lower than that of the shifting diagram, operates as the uppermost gear position.

3. A control device for a vehicular automatic transmission having a shift control unit operative such that (i) with an automatic shift mode set, gear positions in the automatic transmission are automatically switched within a range of a maximum shift-width based on a vehicle condition by referring to a preliminarily stored shifting diagram, and (ii) with a manual shift mode set, the gear positions in the automatic transmission are switched one by one for each manual shift operation of a shift operation device, the control device comprising:
- a high oil-temperature determining unit that determines whether temperature of a working-oil in the automatic transmission lies in a high oil-temperature state exceeding an oil-temperature determining value preliminary set;
- an accelerator-on drive determining unit that determines whether an accelerator-on drive is present with an accelerator pedal of the vehicle depressed;
- an on-high oil-temperature automatic upshift control unit that switches the gear position of the automatic transmission to a maximum speed gear position when the high oil-temperature determining unit determines presence of the high oil-temperature state; and
- an on-high oil-temperature downshift permitting unit that permits a downshift to be executed in the manual shift operation when the automatic upshift control unit switches the gear position of the automatic transmission to the maximum speed gear position and the accelerator-on drive determining unit determines presence of the accelerator-on drive state, the on-high oil-temperature downshift permitting unit permitting the downshift until a gear position selected by the manual shift operation during the manual shift mode reaches a gear position determined based on the vehicle condition by referring to a high oil-temperature shifting diagram preliminarily set in a lower speed area lower than that of the shifting diagram.

4. A control device for a vehicular automatic transmission having a shift control unit operative such that (i) with an automatic shift mode set, gear positions in the automatic transmission are automatically switched within a range of a maximum shift-width based on a vehicle condition by referring to a preliminarily stored shifting diagram, and (ii) with a manual shift mode set, the gear positions in the automatic transmission are switched one by one for each manual shift operation of a shift operation device, the control device comprising:
- a high oil-temperature determining unit that determines whether temperature of a working-oil in the automatic transmission lies in a high oil-temperature state exceeding an oil-temperature determining value preliminary set;
- an accelerator-on drive determining unit that determines whether an accelerator-on drive is present with an accelerator pedal of the vehicle being depressed; and
- an on-high oil-temperature automatic upshift control unit that switches the gear position in the automatic transmission when the high oil-temperature determining unit determines presence of the high oil-temperature state and the accelerator-on drive determining unit determines presence of the accelerator-on drive state, the on-high oil-temperature automatic upshift control unit switching the gear position to a gear position determined based on the vehicle condition by referring to a high oil-temperature shifting diagram preliminarily set in a lower speed area lower than that of the shifting diagram.

* * * * *